United States Patent
Yasuda

(10) Patent No.: US 8,039,542 B2
(45) Date of Patent: Oct. 18, 2011

(54) PIGMENT DISPERSION AND INK COMPOSITION USING THE SAME

(75) Inventor: Koji Yasuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 54 days.

(21) Appl. No.: 12/533,026

(22) Filed: Jul. 31, 2009

(65) Prior Publication Data
US 2010/0081758 A1 Apr. 1, 2010

(30) Foreign Application Priority Data
Sep. 26, 2008 (JP) ................................. 2008-248382

(51) Int. Cl.
*C09D 11/10* (2006.01)
*C09B 67/22* (2006.01)

(52) U.S. Cl. ......... 524/548; 524/612; 523/160; 523/161

(58) Field of Classification Search .................. 523/160, 523/161; 524/548, 612
See application file for complete search history.

(56) References Cited

U.S. PATENT DOCUMENTS
2008/0187679 A1* 8/2008 Sato et al. ..................... 427/508

FOREIGN PATENT DOCUMENTS
| JP | 2003-119414 A | 4/2003 |
| JP | 2003-321628 A | 11/2003 |
| JP | 2004-18656 A | 1/2004 |
| JP | 2004-131589 A | 4/2004 |
| JP | 2007-277514 A | 10/2007 |
| WO | WO 2007006638 A2 * | 1/2007 |
| WO | WO 2007006639 A2 * | 1/2007 |

OTHER PUBLICATIONS

Machine Translation of JP 2008-222843 A (Sep. 25, 2008).*
Machine Translation of JP 2007-131787 A (May 31, 2007).*

* cited by examiner

*Primary Examiner* — David W Wu
*Assistant Examiner* — Vu A Nguyen
(74) *Attorney, Agent, or Firm* — Solaris Intellectual Property Group, PLLC

(57) ABSTRACT

Disclosed is a pigment dispersion containing a polymer compound having a partial structure represented by the following formula (1) at a terminal end of a main chain of the polymer compound, and a pigment. In formula (1), $R^1$ and $R^2$ each independently represent a hydrogen atom or a monovalent substituent; $R^1$ and $R^2$ may form a ring by bonding with each other; and * represents a position that is directly or indirectly bonded to the main chain structure of the compound.

Formula (1)

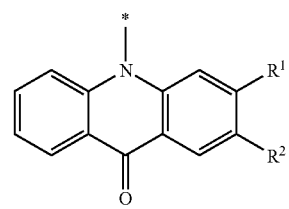

9 Claims, No Drawings

PIGMENT DISPERSION AND INK COMPOSITION USING THE SAME

CROSS-REFERENCE TO RELATED APPLICATION

This application claims priority under 35 USC 119 from Japanese Patent Application No. 2008-248382 filed on Sep. 26, 2008, the disclosure of which is incorporated by reference herein.

BACKGROUND

1. Field of the Invention

The present invention relates to a pigment dispersion and an ink composition using the ink composition, and more specifically, a pigment dispersion with good pigment dispersibilty and an ink composition using good color-forming characteristics using the ink composition.

2. Related Art

With regard to an image recording method for forming an image based on image data signals on a recording medium such as paper, there have been known image recording methods such as the electrophotographic system, the thermal transfer system such as a sublimation type and a fusion type, and the inkjet system and the like. Among them, the inkjet system can be put into practice with the use of relatively inexpensive machines, and an image is directly formed by jetting ink droplets on a recording medium only on the area where the image is required to be recorded, so that the ink can be effectively used, and further running cost is low, and noise is low, thereby the inkjet system is excellent as an image recording method.

Moreover, the inkjet system enables printing not only on plain paper, but non-water absorptive recording media such as a plastic sheet and a metal plate. However, the speeding up of printing and formation of high quality image prints are the most important issues, and the inkjet system is characterized in that the time required for drying and curing of printed droplets influence the sharpness of an image.

As one of the inkjet systems, there is a recording method using an ink composition for inkjet recording which is curable by irradiation with an actinic ray. According to this method, the curable ink composition is irradiated with an actinic ray immediately after a print is formed with the use of the curable ink composition to cure ink droplets thereof, so that a sharp image can be obtained.

In the curable ink composition which can be used for such a recording method, a high pigment dispersibility and the stability of the pigment dispersibility over time are required for forming a high definition image with an excellent color forming property. In general, it is essential to form fine particles of pigment in order to impart clear color tone and high coloration performance to an ink composition. In particular, in the inkjet recording ink composition, since jetted ink droplets greatly influence the sharpness of an image, it is essential to use the small quantity of droplets to be jetted and the particle in a smaller size of the ink composition relative to the thickness of a cured layer formed by the ink composition.

When the pigment particles are formed in a smaller size in order to obtain a high coloration performance, the dispersion of the pigments becomes difficult and pigment aggregates are easily formed. When a pigment dispersant is added so as not to form pigment aggregates, the problem of an increase in the viscosity of ink composition arises.

Both the occurrence of the pigment aggregates and the increase in the viscosity of an ink composition exert an adverse influence on the ink jetting property, thereby resulting in great decrease in the performance of the ink composition. Further, since the ink composition used for the inkjet system is accommodated in a cartridge, the ink composition is heated at the time of being jetted, and the temperature of the ink composition is lowered at the time of not being jetted and during being stored, the ink composition is subjected to reiterative changes in temperature between heating and cooling. The temperature change exerts an adverse influence on the dispersibilty of the pigment, in addition to the decrease in the dispersibility over time, there are problems such that thickening and agglomeration of the ink dispersion easily take place.

Under these circumstances, it has been demanded that an ink composition which has sufficient flowability, and contains finely dispersed pigment particles stably and further, has the excellent storability of a pigment dispersion over time, and to this end, various proposals on dispersants for obtaining stable pigment dispersions have been made.

For example, an ink composition in which a pigment derivative as a dispersant in order to enhance the affinity for a pigment is used (for example, refer to Japanese Patent Application Laid-Open (JP-A) No. 2003-119414 and JP-A No. 2004-18656), an ink composition in which a polymer having a basic group as a dispersant is used for specific pigments such as phthalocyanines and quinacridones (for example, refer to JP-A No. 2003-321628), and an ink composition in which an ink composition which contains a dispersant such as poly(ethyleneimine)-poly(12-hydroxystearic acid) graft polymer and a specific monomer which dissolves the dispersant, without using an organic solvent (for example, refer to JP-A No. 2004-13158), have been proposed.

However, although these pigment dispersions have an improved stability owing to the function of the dispersant as compared with conventional ink compositions, the formation of finely dispersed particles of pigments being used is still insufficient, and there is still a room for improvement on forming pigment fine particles, and further, there is a problem such that the dispersion stability is still insufficient after the ink composition is stored for a long period of time, or is subjected to reiterative changes in temperatures.

Moreover, it is required to satisfy various characteristics such that a nozzle is not clogged (jetting stability) as a radiation curable ink composition used for an inkjet recording method, in addition to the storability.

In addition, for the purpose of improving the pigment dispersibility, there has been proposed a pigment dispersion containing a dispersant in which an acridone moiety is introduced into the main chain skeleton (for example, refer to JP-A No. 2007-277514).

SUMMARY

The invention has been made in view of the above circumstances and provides a pigment dispersion and an ink composition using the pigment dispersion.

A first aspect of the invention provides a pigment dispersion comprising a polymer compound having a partial structure represented by the following formula (1) at a terminal end of a main chain of the polymer compound, and a pigment:

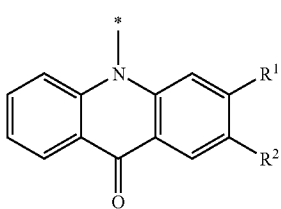

Formula (1)

wherein, in formula (1), $R^1$ and $R^2$ each independently represent a hydrogen atom or a monovalent substituent; $R^1$ and $R^2$ may form a ring by bonding with each other; and * represents a position that is directly or indirectly bonded to the main chain of the polymer compound.

DETAILED DESCRIPTION OF THE INVENTION

As the result of intensive studies by the inventors, it has been found that when a polymer compound having a partial structure represented by the following formula (1) is used as a dispersant for pigment, the polymer compound which is excellent in the pigment dispersibility, or is effectively prevented from the decrease in the dispersion stability can be obtained, even after being stored for a long period of time, or being subjected to changes in temperatures reiteratively. Moreover, it has been found that an ink composition which has clear color tone and high coloration performance, has excellent ink jetting property, and can form a high-definition image obtained by the use of the ink composition.

Hereinafter, the invention will be described in detail.
[Pigment Dispersion]

The pigment dispersion of the invention includes (a) a polymer compound which has a partial structure represented by the following formula (1) at a terminal end of a main chain of the polymer compound, and (b) a pigment:

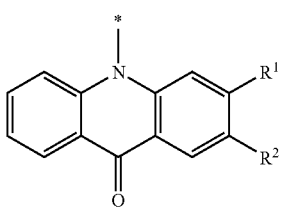

Formula (1)

wherein $R^1$ and $R^2$ each independently represent a hydrogen atom or a monovalent substituent, and $R^1$ and $R^2$ may form a ring by bonding with each other.
* represents a position that is directly or indirectly bonded to the main chain structure of the polymer compound.

<(a) Polymer Compound Having Partial Structure Represented by the Following Formula (1) at the Terminal End of the Main Chain>

In the pigment dispersion of the invention, a polymer compound having a partial structure represented by the following formula (1) at the terminal end of the main chain (hereinafter, referred to as a "specific polymer compound A", and may be simply referred to as a specific compound, occasionally), is used.

In the invention, the specific polymer compound A functions as a dispersant for pigment used together. It can be assumed that the specific polymer compound A contains a partial structure which has a high affinity to the pigment and a high adsorptivity to the pigment, although the action mechanism is not clear. In an exemplary embodiment of the invention, an outstanding effect can be exerted, because the partial structure is present at the terminal end of the polymer main chain. Further, the agglomeration of pigment particles can be effectively prevented due to the steric repulsive effect of the main chain moiety in the specific polymer compound A, whereby the dispersion stability becomes good. Accordingly, it can be presumed that when a pigment dispersion composition using such a compound is used for an ink composition, the dispersibility and dispersion stability of the pigment in the ink composition can be enhanced, so that an increase in viscosity and a decrease in ink jetting property attributable to the agglomeration or precipitation of the pigment can be effectively prevented.

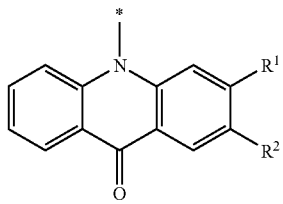

Formula (1)

In formula (1), $R^1$ and $R^2$ each independently represent a hydrogen atom or a monovalent substituent. The monovalent substituents include an alkyl group having 1-4 carbon atoms, an alkoxy group having 1-4 carbon atoms, an aryl group, an acyl group, an ester group and an amide group.

Further, $R^1$ and $R^2$ may be combined with each other to form a ring. The rings which may be formed include a heterocyclic ring containing a hetero atom selected from an oxygen atom, a nitrogen atom, a sulfur atom and the like, an aromatic ring such as a benzene ring, a condensed ring and thereof. The rings which may be formed are preferably 5 to 6 membered, and the number of the rings is preferably 1 to 3.

Examples of the aryl group include a phenyl group, 4-methyl phenyl group, 3-methyl phenyl group, 4-methoxy phenyl group, 3-ethoxy phenyl group, 4-methyl ester group, 3-ethyl ester group, 4-acetamide phenyl group, 3-acetamide phenyl group, 4-benzamide group, 3-benzamide group, 2-furyl group, 3-furyl group, 2-thiophenyl group, 3-thiophenyl group and the like.

Examples of the acyl group include an acetyl group, benzoyl group and the like.

The ester group represents an ester group having 1-8 carbon atoms which may have a substituent, and, specifically, a methyl ester group, ethyl ester group, 2-ethylhexyl ester group and the like.

Examples of the amide group include —C(O)NH$_2$, —C(O)NHMe, —C(O)NMe$_2$, —C(O)NHEt, —C(O)NHBu, —C(O)NHPh, —NHC(O)Me, —NMeC(O)Me, —NHC(O)Ph and the like.

Examples of the rings formed by combining $R^1$ and $R^2$ with each other include the following structures:

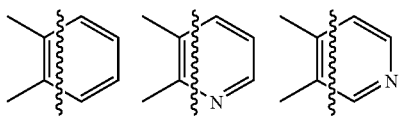

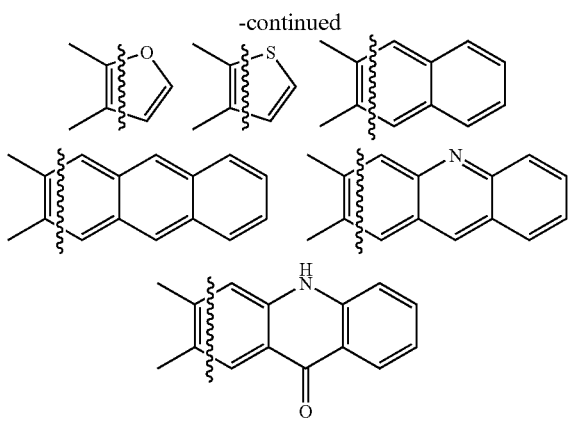

In the above formula (1), * represents a linking position with a polymer main chain, provided that the position * and the main chain structure may be directly bonded with each other or may be bonded via linker region such as a linking chain. The main chain structure of the polymer compound to be connected directly or indirectly to the linking position * may be selected from known polymers and the like in accordance with the intended purpose.

Examples of the main chain structure in the specific polymer compounds of the invention include preferably at least one selected from the group consisting of a polymer or copolymer of vinyl monomers, an ester-based polymer, an ether-based polymer, an urethane-based polymer, an amide-based polymer, an epoxy-based polymer, a silicone-based polymer, and the modified product or the copolymer thereof, more preferably, at least one selected from the group consisting of the polymer or copolymer of vinyl monomers, the ester-based polymer, the ether-based polymer, the urethane-based polymer and the modified product or the copolymer thereof, and particularly preferably the polymer or copolymer of vinyl monomers.

In addition, here, the copolymers thereof include any combination of the exemplified polymers, for example, such as a polyether/polyurethane copolymer, the copolymer of a polymer of polyether/vinyl monomer and the like, and the structure of the copolymers may be any of a random copolymer, a block copolymer and a graft copolymer.

Furthermore, the polymer which constitutes the main chain is preferably soluble in an organic solvent. When the polymer has a low affinity for an organic solvent, the affinity for the dispersion medium becomes low when the polymer is used as a pigment dispersant, whereby a sufficient adsorption layer required for the dispersion stability may not be secured.

Hereinafter, raw material monomers for forming the polymer used as the main chain of the specific polymer compound A will be described.

Although the above vinyl monomers are not specifically restricted, for example, an (meth)acrylates, crotonates, vinyl esters, dimaleates, difumarates, diitaconates, (meth)acrylamides, styrenes, vinylethers, vinyl ketones, olefins, maleimides, (meth)acrylonitrile and the like are preferable.

Hereafter, preferable examples of these vinyl monomers will be explained.

Examples of (meth)acrylates include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, amyl (meth)acrylate, n-hexyl (meth)acrylate, cyclohexyl (meth)acrylate, t-butyl cyclohexyl (meth)acrylate, 2-ethylhexyl (meth)acrylate, t-octyl (meth)acrylate, dodecy (meth)acrylate, octadecyl (meth)acrylate, acetoxyethyl (meth)acrylate, phenyl (meth)acrylate, 2-hydroxy ethyl (meth)acrylate, 2-hydroxypropyl (meth)acrylate, 3-hydroxypropyl (meth)acrylate, 2-ethoxyethyl (meth)acrylate, 2-(2-methoxyethoxy)ethyl (meth)acrylate, 2-chloroethyl (meth)acrylate, glycidyl (meth)acrylate, vinyl (meth)acrylate, 1-propenyl (meth)acrylate, allyl (meth)acrylate, aryloxyethyl (meth)acrylate, propagyl (meth)acrylate, benzyl (meth)acrylate, diethylene glycol monomethyl ether (meth)acrylate, diethylene glycol monoethyl ether(meth)acrylate, triethylene glycol monomethyl ether (meth)acrylate, triethylene glycol monoethyl ether (meth)acrylate, β-phenoxyethoxyethyl (meth)acrylate, dicyclopentenyl (meth)acrylate, dicyclopentenyloxyethyl (meth)acrylate, trifluoroethyl (meth)acrylate, octafluoropentyl(meth)acrylate, perfluorooctylethyl(meth)acrylate, dicyclopentanyl (meth)acrylate, tribromophenyl (meth)acrylate, tribromohenyloxyethyl (meth)acrylate, γ-butyrolactone (meth)acrylate and the like.

Examples of crotonates include butylcrotonate, hexyl crotonate and the like.

Examples of vinyl esters include vinyl acetate, vinylchloro acetate, vinyl propionate, vinyl butylate, vinyl methoxyacetate, vinyl benzoate and the like.

Examples of dimaleates include dimethyl maleate, diethyl maleate, dibutyl maleate and the like.

Examples of difumarates include dimethyl fumarate, diethyl fumarate, dibutyl fumarate and the like.

Examples of diitaconates include dimethyl itaconate, diethyl itaconate, dibutyl itaconate and the like.

Examples of (meth)acrylamides include (meth)acrylamide, N-methyl (meth)acrylamide, N-ethyl (meth)acrylamide, N-propyl (meth)acrylamide, N-isopropyl (meth)acrylamide, N-n-butyl (meth)acrylamide, N-t-butyl (meth)acrylamide, N-cyclohexyl (meth)acrylamide, N-(2-methoxyethyl)(meth)acrylamide, N,N-dimethyl (meth)acrylamide, N,N-diethyl (meth)acrylamide, N-phenyl (meth)acrylamide, N-benzyl (meth)acrylamide, (meth)acryloyl morpholine, diacetone acrylamide, N-methylol acrylamide, N-hydroxyethyl acrylamide, vinyl (meth)acrylamide, N,N-diallyl (meth)acrylamide, N-allyl(meth)acrylamide and the like.

Examples of styrenes include styrene, methyl styrene, dimethyl styrene, trimethyl styrene, ethyl styrene, isopropyl styrene, butyl styrene, hydroxy styrene, methoxy styrene, buthoxy styrene, acetoxy styrene, chlorostyrene, dichlorostyrene, bromostyrene, chloromethylstyrene; hydroxystyrene, vinyl methylbenzoate, α-methyl styrene and the like which are protected by a deprotectable group with an acidic material (for example, t-Boc and the like), and the like.

Examples of vinylethers include methyl vinylether, ethyl vinylether, 2-chloroethyl vinylether, hydroxyethyl vinylether, propyl vinylether, butyl vinylether, hexyl vinylether, octyl vinylether, methoxyethyl vinylether, phenyl vinylether and the like.

Examples of vinylketones include methyl vinylketone, ethyl vinylketone, propyl vinylketone, phenyl vinylketone and the like.

Examples of olefins include ethylene, propylene, isobutylene, butadiene, isoprene and the like.

Examples of maleimides include maleimide, butyl maleimide, cyclohexyl maleimide, phenyl maleimide and the like.

(Meth)acrylonitrile, a heterocyclic group substituted with a vinyl group (for example, vinyl pyridine, N-vinyl pyrrolidone, vinyl carbazole and the like), N-vinyl formamide, N-vinyl acetamide, N-vinyl imidazole, vinyl caprolactone and the like may be used.

In addition to the above compounds, for example, vinyl monomers having a functional group such as a urethane group, a urea group, a sulfonamide group, a phenol group and an imide group may also be used. Such a monomer having a urethane group or a urea group may be suitably synthesized, for example, using an addition reaction of an isocyanate group with a hydroxyl group or an amino group. More specifically, the monomer may be synthesized using the addition reaction of a monomer containing an isocyanate group and a compound having one hydroxyl group or a compound having one primary amino group or secondary amino group, or the addition reaction of a monomer containing a hydroxyl group or a monomer containing a primary amino group or secondary amino group, and an isocyanate.

The polymer compound having the partial structure represented by the formula (1) is a polymer compound containing the partial structure represented by the formula (1) at the terminal end of the main chain of the polymer compound. Although the partial structure may be bonded to the both the terminal ends of the main chain of the polymer compound, or may be bonded to one terminal end of the main chain of the polymer compound, it is preferable that the partial structure is bonded to only one terminal end of the main chain, from the viewpoint of the dispersion stability and synthesis.

Since the specific partial structure represented by the formula (1) has at the terminal end of the main chain of the polymer compound, the affinity for pigment and the dispersion stability can be improved.

In the polymer compounds having the partial structure represented by the formula (1), the polymer compound represented by the following formula (1-2) is preferable. The polymer compound represented by the following formula (1-2) is a compound which has a structure formed by linking the partial structure represented by the formula (1) in which in both the substituents $R^1$ and $R^2$ are hydrogen atoms in the polymer compound having the partial structure represented by the formula (1) to one terminal end of the main chain structure represented by $P^1$ via a linking chain —$R^4$—S—$R^5$—.

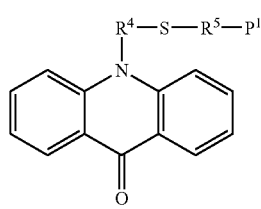

Formula (1-2)

In formula (1-2), $R^4$ and $R^5$ each independently represent a single bond or a divalent organic linking group.

In formula (1-2), $P^1$ represents a polymer skeleton (main chain structure) and can be selected from known polymers or the like in accordance with the intended use. As to preferable embodiments of the polymer, the polymers similar to those recited as the main chain structure, to which the partial structure represented by the formula (1) can be bonded, may be exemplified.

As the divalent organic linking group represented by $R^4$ and $R^5$, the group which is constituted by containing at least one group selected from the group consisting of 0 to 100 carbon atoms, 0 to 10 nitrogen atoms, 0 to 50 oxygen atoms, 0 to 200 hydrogen atoms and 0 to 20 sulfur atoms can be exemplified, and the linking group may be unsubstituted, or may further contain a substituent.

Specific examples of the divalent organic linking group include the group constituted by the following structural unit or the group constituted by combining the following structural units:

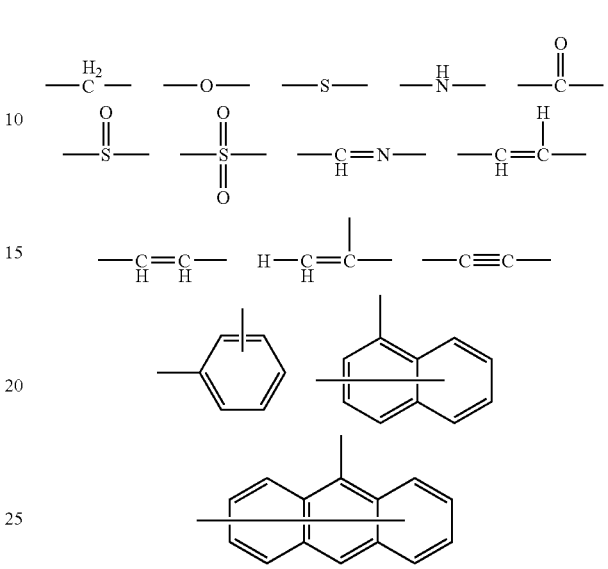

Preferably, $R^4$ and $R^5$ each independently represents a single bond, or a divalent linking group constituted by containing at least one selected from the group consisting of 1 to 50 carbon atoms, 0 to 8 nitrogen atoms, 0 to 25 oxygen atoms, 1 to 100 hydrogen atoms and 0 to 10 sulfur atoms.

More preferably, $R^4$ and $R^5$ represent a single bond, or a divalent linking group constituted by containing at least one selected from the group consisting of 1 to 30 carbon atoms, 0 to 6 nitrogen atoms, 0 to 15 oxygen atoms, 1 to 50 hydrogen atoms and 0 to 7 sulfur atoms.

Still more preferably, $R^4$ and $R^5$ represent a single bond, or a divalent linking group constituted by containing at least one selected from the group consisting of 1 to 10 carbon atoms, 0 to 5 nitrogen atoms, 0 to 10 oxygen atoms, 1 to 30 hydrogen atoms and 0 to 5 sulfur atoms.

In the above, when the divalent organic linking group has a substituent, the substituent includes, for example, an alkyl group having 1 to 20 carbon atoms such as a methyl group and an ethyl group; an aryl group having 6 to 16 carbon atoms such as a phenyl group and a naphthyl group; a hydroxyl group, an amino group, a carboxyl group, a sulfonamide group, N-sulfonylamide group; an acyloxy group having 1 to 6 carbon atoms such as acetoxy group; an alkoxy group having 1 to 6 carbon atoms such as a methoxy group and an ethoxy group; a halogen atom such as chlorine and bromine; an alkoxycarbonyl group having 2 to 7 carbon atoms such as a methoxycarbonyl group, an ethoxycarbonyl group and cyclohexyloxy carbonyl group; a cyano group; and a carbonate groups such as a t-butyl carbonate.

Preferable examples of the monomers [M-1 to M-10] which can form the polymer compound having the partial structure represented by the formula (1) are shown below. In addition, the invention is not limited to these examples at all. P in the structural formula represents a polymer skeleton.

M-1
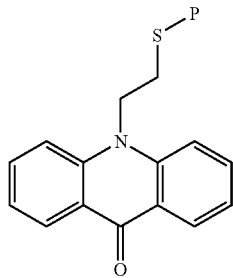
M-2
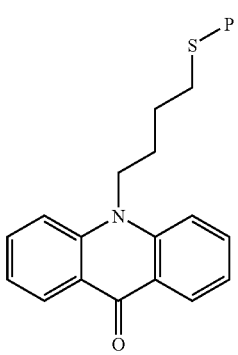
M-3
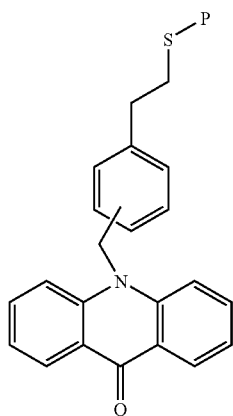
M-4
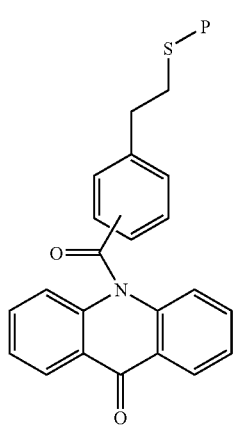
M-5
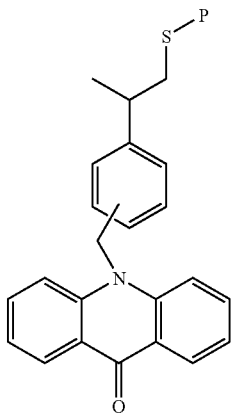
M-6
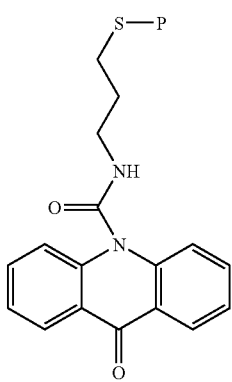
M-7
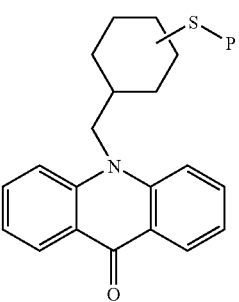
M-8
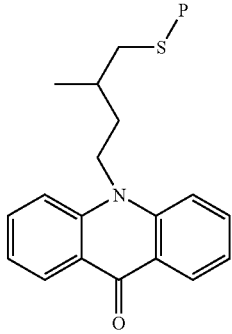

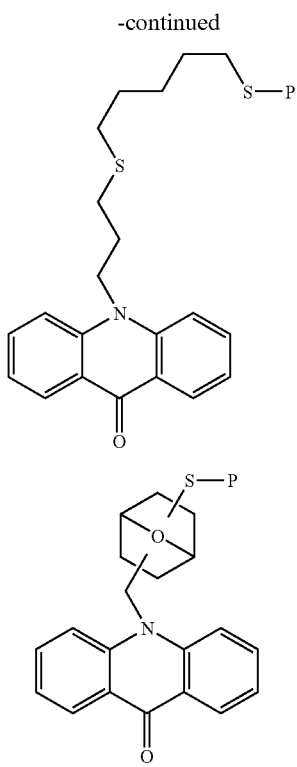

Among the above exemplified compounds, M-1, M-2, M-3, M-4, M-6 and M-10 are preferable, and M-1, M-3 and M-4 are more preferable, from the viewpoint of the easiness of synthesis. Moreover, at this time, P is preferably a (meth) acrylate.

The polymer compound having the partial structure represented by the formula (1) is preferably a polymer compound having a partial structure represented by the following formula (2) (hereinafter, referred to as a "specific polymer compound B", and may be simply referred to as specific compound, occasionally).

In the invention, the specific polymer compound B, similarly to the specific polymer compound A, functions as a dispersant for a pigment to be used together in the pigment dispersion. It can be presumed that in the specific polymer compound B, a partial structure represented by the partial structure represented by the formula (2) has a high affinity for the pigment and a high adsorptivity to the pigment, and further, excellent dispersibility and dispersion stability for the pigment due to the steric repulsive effect of the polymer chain to which the partial structure is bonded, can be developed.

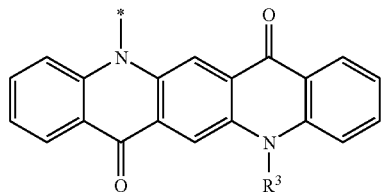

Formula (2)

In formula (2), $R^3$ represents a hydrogen atom, an alkyl group, an acyl group or a carbamoyl group. * represent a linking position with a polymer main chain, provided that the position * and the main chain structure may be directly bonded with each other or may be bonded via linker region such as a linking chain. The partial structure represented by the formula (2) represents an embodiment where $R^1$ and $R^2$ in formula (1) are combined with each other to form a condensed cyclic structure containing a hetero atom.

In the above formula (2), * represents a linking position with a main chain structure. The main chain structure of the polymer compound can be selected from known polymers or the like in accordance with the intended use. Preferred embodiments of the polymers similar to those recited as the main chain structure of the polymer compound, to which the partial structure represented by the formula (1) can be bonded, may be exemplified.

In formula (2), the alkyl group or acyl group represented by $R^3$ has preferably 1 to 10 carbon atoms, more preferably 1 to 8 carbon atoms, and still more preferably 1 to 7 carbon atoms.

In addition, (a) the polymer compound having the partial structure represented by the formula (2) is a polymer compound having the partial structure represented by the formula (2) at the terminal end of the main chain of the polymer compound.

In the polymer compound having the partial structure represented by the formula (2), a polymer compound represented by the following formula (2-2) is preferable. The polymer compound represented by the following formula (2-2), is a compound which has a structure formed by linking the partial structure represented by the formula (2) to one terminal end of a main chain structure represented by $P^2$ via a linking chain $—R^7—S—R^8—$.

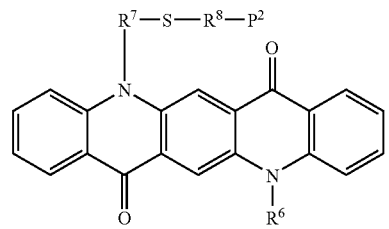

Formula (2-2)

In formula (2-2), $R^6$ represents a hydrogen atom, an alkyl group, an acyl group and a carbamoyl group.

Examples of the alkyl group include a methyl group, ethyl group, n-propyl group, i-propyl group, n-butyl group, i-butyl group, t-butyl group, n-hexyl group, cyclohexyl group, n-octyl group, phenylmethyl group, phenylethyl group; and a methyl group, ethyl group, n-propyl group, n-hexyl group, phenylmethyl group and phenylethyl group are preferable, and a methyl group, ethyl group and phenyl methyl group are particularly preferable.

The acyl group represents a group represented by the following formula (5), and $R^9$ is an alkyl group.

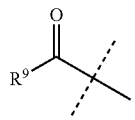

Formula (5)

In formula (5), examples of the alkyl group represented by $R^9$ include a methyl group, ethyl group, n-propyl group, i-propyl group, n-butyl group, i-butyl group, t-butyl group, n-hexyl group, cyclohexyl group, n-octyl group, phenylmethyl group, phenylethyl group, phenyl group, an ortho, meta or para substituted methoxyphenyl group, an ortho, meta or para substituted fluorophenyl group, an ortho, meta or para substituted chlorophenyl group, an ortho, meta or para substituted bromophenyl group, an ortho, meta or para substituted iodophenyl group, an ortho, meta or para substituted trifluoromethyl phenyl group and the like; a methyl group, ethyl group, t-butyl group, phenylmethyl group, phenyl group, an ortho, meta, or para substituted methoxyphenyl group, an ortho, meta or para substituted fluorophenyl group, an ortho, meta or para substituted chlorophenyl group, an ortho, meta or para substituted bromophenyl group, an ortho meta or para substituted iodophenyl group and an ortho, meta or para substituted trifluoromethyl phenyl group are preferable; and among them, a methyl group, ethyl group, phenyl group, an ortho, meta, or para substituted methoxyphenyl group, an ortho, meta or para substituted fluorophenyl group, an ortho, meta or para substituted chlorophenyl group, an ortho, meta or para substituted bromophenyl group, an ortho meta or para substituted iodophenyl group and an ortho, meta or para substituted trifluoromethyl phenyl group are particularly preferable.

The carbamoyl group represented by $R^6$ in formula (2-2) represents the group represented by the following formula (6), and $R^{10}$ is an alkyl group.

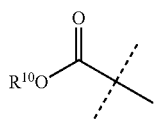

Formula (6)

The alkyl group represented by $R^{10}$ in formula (6) is synonymous with $R^9$ in formula (5). Among them, a methyl group, ethyl group, t-butyl group, phenyl methyl group, phenyl group and an ortho, meta or para substituted methoxyphenyl group are preferable, and a methyl group, ethyl group, t-butyl group and phenylmethyl group are particularly preferable.

In formula (2-2), $R^7$ and $R^8$ represent a single bond or a divalent organic linking group.

As the divalent organic linking group, the group which constitutes by containing at least one selected from the group consisting of 0 to 100 carbon atoms, 0 to 10 nitrogen atoms, 0 to 50 oxygen atoms, 0 to 200 hydrogen atoms and 0 to 20 sulfur atoms can be exemplified, and the linking group may be unsubstituted, or may further contain a substituent.

In addition, $R^7$ and $R^8$ are synonymous with $R^4$ and $R^5$ in formula (1-2), and the preferred embodiments thereof are also the same as those of $R^4$ and $R^5$.

In formula (2-2), $P^2$ represents a polymer skeleton (main chain structure) and can be selected from known polymers or the like in accordance with the intended use. As the preferable embodiments of the polymer, the polymers similar to those recited as the main chain structure, to which the partial structure represented by the formula (2) can be bonded, may be exemplified.

Preferred examples of the monomers [M-11-M-20] which can form the polymer compound having the partial structure represented by the formula (2) are shown below. In addition, the invention is not limited to these examples at all. $P^2$ in the structural formula represents a polymer skeleton.

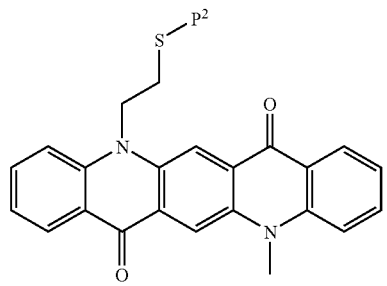

M-11

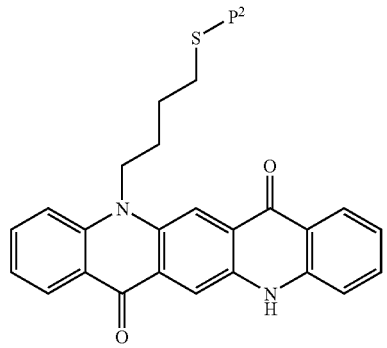

M-12

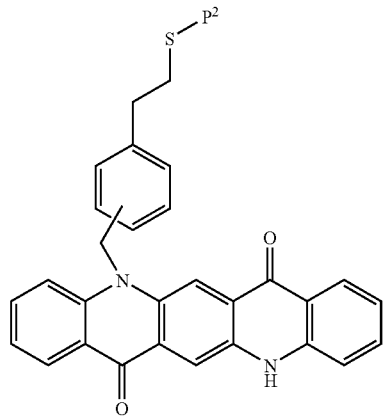

M-13

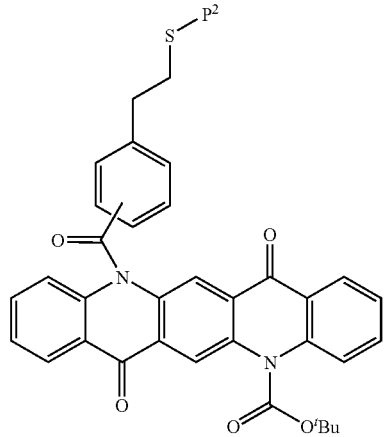

M-14

-continued

M-15
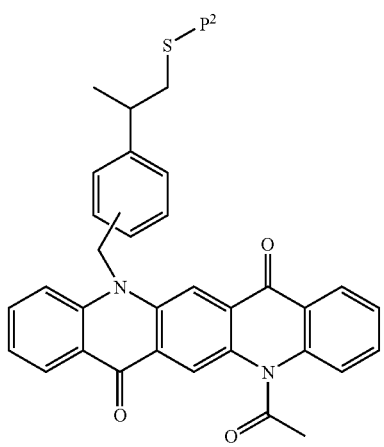

M-16
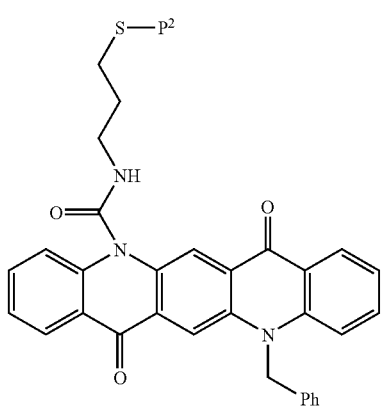

M-17
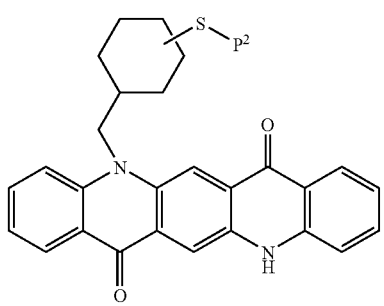

M-18
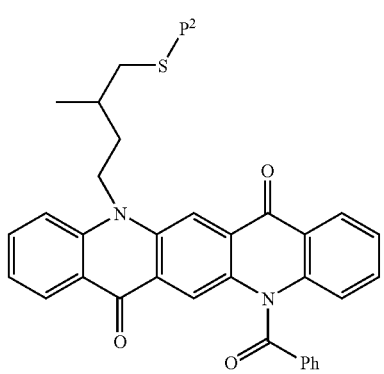

-continued

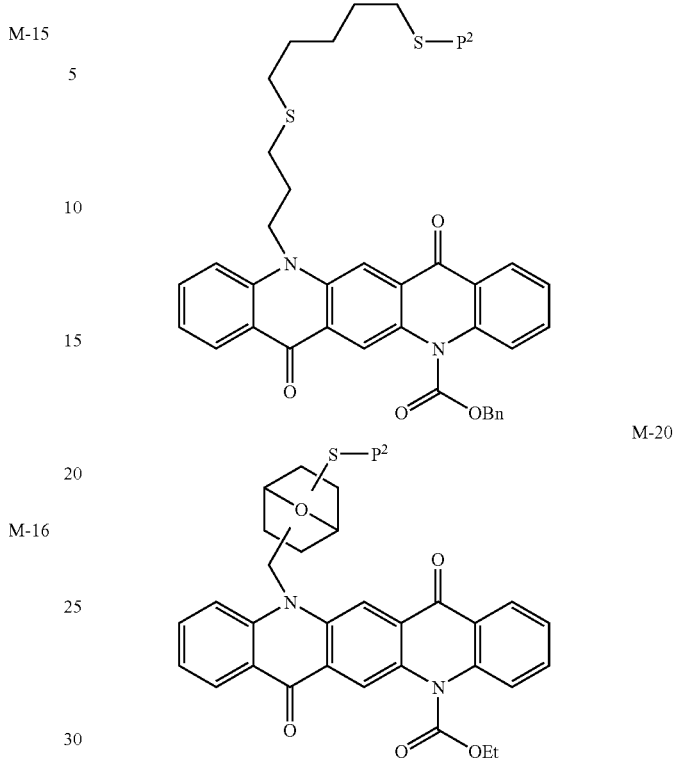

M-19

M-20

Among the above exemplified compounds, M-11, M-12, M-13, M-14, M-16 and M-20 are preferable, and M-11, M-12, M-13 and M-14 are more preferable, from the viewpoint of the easiness of synthesis. Moreover, the structure of $P^2$ is preferably (meth)acrylates.

As the specific polymer compound in the invention, as described above, in addition to the main chain structure, which has a general polymer structure, to which the partial structure represented by the formula (1) or the formula (2) can be bonded, a graft copolymer containing repeating units derived from a polymerizable oligomer having an ethylenic unsaturated double bond at the terminal end may be used.

In addition, since the polymerizable oligomer having an ethylenic polymerizable group at the terminal end is a compound having a predetermined molecular weight, it is also called a macromonomer.

Hereafter, this polymerizable oligomer is explained.

The polymerizable oligomer in the invention contains a polymer chain moiety and a polymerizable functional group moiety having an ethylenic unsaturated double bond. It is preferable that the polymerizable functional group moiety having an ethylenic unsaturated double bond is present only at one terminal end in the polymerizable oligomer, from the viewpoint of obtaining a desired graft polymer. As the polymerizable functional group having an ethylenic unsaturated double bond for forming the polymerizable oligomer, for example, a (meth)acryloyl group, a vinyl group and the like are suitably exemplified, and in particular, a (meth)acryloyl group is preferable. Here, the (meth)acryloyl group is a general term for an acryloyl group and a methacryloyl group, and, hereinafter, this general term may be used.

Further, as the polymer chain moiety for forming the polymerizable oligomer, for example, a homopolymer or a copolymer formed by at least one kind of monomers selected from the group consisting of an alkyl (meth)acrylate, styrene and the derivative thereof, acrylonitrile, vinyl acetate and butadiene; or polyethylene oxide, polypropylene oxide, polycaprolactone and the like are suitably exemplified.

As a preferable example of the polymerizable oligomer used in the invention, an oligomer represented by the following formula (7) is exemplified.

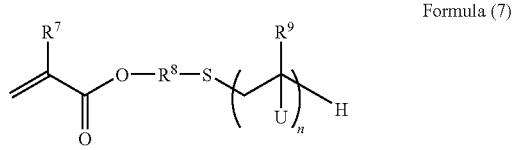

Formula (7)

In formula (7), $R^7$ and $R^9$ each independently represent a hydrogen atom or a methyl group.

$R^8$ represents the alkylene group having 1 to 12 carbon atoms (preferably an alkylene group having 2 to 4 carbon atoms, and may have a substituent (for example, a hydroxyl group), and also may be connected via an ester bond, ether bond, amide combination and the like).

U represents a phenyl group, a phenyl group which has an alkyl group having 1 to 4 carbon atoms or —$COOR^a$ (here, $R^a$ represents an alkyl group having 1 to 12 carbon atoms, a phenyl group, or an arylalkyl group having 7 to 10 carbon atoms), and represents preferably a phenyl group or —$COOR^a$ (here, $R^a$ represents an alkyl group having 1 to 12 carbon atoms). n is an integer of 20 to 200 and preferably an integer of 20 to 100.

Preferable examples of the oligomer (macromonomer) represented by the formula (7), include polymers such as polymethyl (meth)acrylate, poly-n-butyl (meth)acrylate, poly-i-butyl (meth)acrylate and a polymer having a (meth) acryloyl group at one terminal end of polystyrene molecule.

Examples of such commercially available polymerizable oligomers include for example, one end methacryloylated polystyrene oligomer (Mn=6,000, AS-6 (trade name), manufactured by Toagosei Co., Ltd.), one end methacryloylated polymethyl methacrylate oligomer (Mn=6000, AA-6 (trade name), manufactured by Toagosei Co., Ltd.), one end methacryloylated poly-n-butylacrylate oligomer (Mn=6000, AB-6 (trade name), manufactured by Toagosei Co., Ltd.) and the like.

As the polymerizable oligomers used in the invention, in addition to the polymerizable oligomer represented by the above formula (7), the oligomers represented by the following formula (8) may also be preferably used.

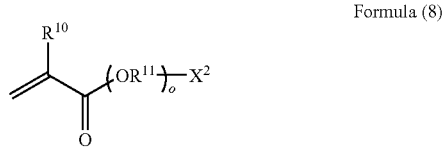

Formula (8)

In formula (8), $R^{10}$ represents a hydrogen atom or a methyl group. $R^{11}$ represents an alkylene group having 1 to 8 carbon atoms, an alkylene group having 1 to 6 carbon atoms is preferable and an alkylene group having 2 to 3 carbon atoms is more preferable.

$X^2$ represents —$OR^{12}$ or $OCOR^{13}$. $R^{12}$ and $R^{13}$ each independently represent a hydrogen atom, an alkyl group (an alkyl group having 1 to 18 carbon atoms is preferable), or an aryl group (a phenyl group substituted with an alkyl group having 1 to 18 carbon atoms is preferable).

o represents an integer of 2 to 200, an integer of 5 to 100 is preferable, and an integer of 10 to 100 is more preferable.

Preferable examples of the oligomer represented by the formula (8) include polyethyleneglycol mono(meth)acrylate, polypropyleneglycol mono(meth)acrylate, polyethyleneglycol polypropyleneglycol mono(meth)acrylate, polytetramethyleneglycol monomethacrylate and the like. These may be commercial available products or may be suitably synthesized products.

Examples of commercial available products of the oligomers represented by the formula (8) include, for example, methoxypolyethyleneglycol methacrylate (NK ESTER M-40G, M-90G and M-230G ((trade names) manufactured by Toagosei Co., Ltd.), and (BLEMMER PME-100, PME-200, PME-400, PME-1000, PME-2000 and PME-4000 ((trade names), manufactured by NOF Corporation); polyethyleneglycol monomethacrylate (BLEMMER PE-90, PE-200 and PE-350 (trade names) manufactured by NOF Corporation); polypropyleneglycol monomethacrylate (BLEMMER PP-500, PP-800 and PP-1000 (trade names), manufactured by NOF Corporation); polyethyleneglycol polypropyleneglycol monomethacrylate (BLEMMER 70PEP-370B (trade name) manufactured by NOF Corporation); polyethyleneglycol polytetramethyleneglycol monomethacrylate (BLEMMER 55PET-800 (trade name) manufactured by NOF Corporation); and polypropyleneglycol polytetramethyleneglycol monomethacrylate (BLEMMER NHK-5050 (trade name) manufactured by NOF Corporation).

Here, the molecular weight of the polymerizable oligomer (macromonomer) used in the invention is preferably from 1,000 to 10,000 and is more preferably from 2,000 to 9,000 in terms of the polystyrene-converted number average molecular weight (Mn).

The specific polymer compound in the invention is a polymer compound having the partial structure represented by the formula (1) or the formula (2), or a polymer compound represented by the formula (1-2) or the formula (2-2).

Further, in the polymer main chain structure, to which the partial structure represented by the formula (1) and the formula (2) can be bonded, and in formula (1-2) and the formula (2-2), as the main chain structure represented by $P^1$ and $P^2$, a copolymer which contains repeating units derived from the polymerizable oligomer (macromonomer) and general repeating units which constitute the main chain may be used.

As the specific polymer compound in the invention, when using a copolymer with the polymerizable oligomer (macromonomer), the ratio of the repeating units derived from the polymerizable oligomer is preferably from 30% by mass to 95% by mass, and more preferably from 50% by mass to 90% by mass.

In addition, in the specific polymer compound in the invention, the ratio of the repeating units derived from the other monomer is preferably from 5% by mass to 30% by mass.

The weight average molecular weight (Mw) of the specific polymer compound in the invention, for example, is preferably from 1,000 to 300,000, more preferably from 2,000 to 200,000, and still more preferably from 5,000 to 100,000. The weight average molecular weight (Mw) can be measured by using a gel permeation chromatography (carrier: tetrahydrofuran or dimethyl formamide), and can be calculated in terms of the polystyrene-converted weight average molecular weight.

In the invention, the polymer compound (specific polymer compound) having the partial structure represented by the formula (1) or the formula (2), or a polymer compound (specific polymer compound) represented by the formula (1-2) or the formula (2-2) may be used alone, or two or more kinds thereof may be used together.

The content of the specific polymer compound in the pigment dispersion of the invention is preferably from 2 parts by mass to 100 parts by mass, and more preferably from 2 parts by mass to 50 parts by mass with respect to 100 parts by mass of pigment in a dispersion.

When the content of the specific polymer compound is in the above range, the dispersibility of pigment becomes sufficient, and the agglomeration of pigment can be prevented, an increase in viscosity can be suppressed, and further, the viscosity can be maintained within a preferable range.

A known dispersant may be used in addition to the specific polymer compound in the pigment dispersion of the invention, unless otherwise the effect of the invention is impaired.

In this case, it is preferable that the content of the known dispersant is 50% by mass or less relative to the specific polymer compound in the pigment dispersion.

<(b) Pigment>

(b) Pigments used in the pigment dispersion of the invention are not specifically restricted and may be appropriately selected in accordance with the intended purpose. For example, known organic pigments, inorganic pigments and the like may be exemplified. Further, resin particles dyed with a dye, a commercial available pigment dispersion and surface-treated pigment (for example, dispersion in which a pigment is dispersed in an insoluble resin as a dispersion medium, a resin is grafted on the surface of resin particles, or the like) may be exemplified.

In addition, for example, pigments recited in "Dictionary of Pigment" edited by Seishiro Ito (published in 2000), "Industrial Organic Pigments" written by W. Herbst, K. Hunger, and JP-A Nos. 2002-12607, 2002-188025, 2003-26978 and 2003-342503 may be exemplified.

Examples of organic pigments and inorganic pigments include, for example, a yellow pigment, magenta pigment, blue pigment, cyan pigment, green pigment, orange pigment, brown pigment, violet pigment, black pigment, white pigment and the like. Further, organic pigments generally include, for example, phthalocyanine-based, insoluble azo-based, azo lake-based, anthraquinone-based, quinacridone-based, dioxazine-based, diketopyrrolopyrrol-based, anthrapyrimidine-based, anthanethrone-based, indanthrone-based, flavanthrone-based, perinone-based, perylene-based, thioindigo-based and quinophthalone-based pigments.

The yellow pigment is a pigment which assumes yellow color, and includes, for example, mono-azo pigments such as C.I. Pigment Yellow 1 (Fast Yellow G and the like) and C.I. Pigment Yellow 74; disazo pigments such as C.I. Pigment Yellow 12 (Disazo Yellow and the like), C.I. Pigment Yellow 17, C.I. Pigment Yellow 97, C.I. Pigment Yellow 3, C.I. Pigment Yellow 16, C.I. Pigment Yellow 83, C.I. Pigment Yellow 155 and C.I. Pigment Yellow 219; azo lake pigments such as C. I. Pigment Yellow 100 (Tartrazine Yellow Lake and the like); condensed azo pigments such as C.I. Pigment Yellow 95 (condensed azo yellow and the like), C.I. Pigment Yellow 93, C.I. Pigment Yellow 94, C.I. Pigment Yellow 128 and C.I. Pigment Yellow 166; acid dye lake pigments such as C.I. Pigment Yellow 115 (Quinoline Yellow Lake and the like); basic dye lake pigments such as Pigment Yellow 18 (Thioflavin Lake and the like); anthraquinone pigments such as C.I. Pigment Yellow 24 (Flavanthrone Yellow and the like); quinophthalone pigments such as C.I. Pigment Yellow 110 (Quinophthalone Yellow Lake and the like); isoindoline pigments such as C.I. Pigment Yellow 139 (Isoindoline Yellow and the like); pyrazolone pigments such as C.I. Pigment Yellow 60 (Pyrazolone Yellow and the like); acetolone pigments such as C.I. Pigment Yellow 120, C.I. Pigment Yellow 154, C.I. Pigment Yellow 167, C.I. Pigment Yellow 151, C.I. Pigment Yellow 175, C.I. Pigment Yellow 180, C.I. Pigment Yellow 181 and C.I. Pigment Yellow 194; metal complex pigment such as C.I. Pigment Yellow 150; nitroso pigments such as C.I. Pigment Yellow 153 (Nickel Nitroso Yellow and the like); metal complex azomethine pigments such as C.I. Pigment Yellow 117 (Copper Azomethine Yellow and the like).

The magenta pigments is a pigment which assumes red or magenta color, and includes, for example, monoazo-based pigments such as C.I. Pigment Red 3 (Toluidine Red and the like); β-naphthol pigments such as C.I. Pigment Red 1, C.I. Pigment Red 4 and C.I. Pigment Red 6; disazo pigments such as C.I. Pigment Red 38 (Pyrazolone Red B and the like); azo lake pigments such as C. I. Pigment Red 53:1 (Lake Red C and the like), C.I. Pigment Red 57:1 (Brilliant Carmin 6B and the like), C. I. Pigment Red 52:1 and C.I. Pigment Red 48 (β-oxynaththoic acid lake etc.); condensed azo pigments such as C.I. Pigment Red 144, C.I. Pigment Red 166, C.I. Pigment Red 220, C.I. Pigment Red 214, C.I. Pigment Red 221 and C.I. Pigment Red 242 (Condensed Azo Red and the like); acid dye lake pigments such as C.I. Pigment Red 174 (Phloxine B Lake and the like) and the C.I. Pigment Red 172 (Erythrosine Lake and the like); basic dye lake pigments such as C.I. Pigment Red 81 (Rhodamine 6G' Lake and the like); anthraquinone-based pigments such as C.I. Pigment Red 177 (Dianthraquiononyl Red and the like); thioindigo pigments such as C.I. Pigment Red 88 (Thioindigo Bordeaux and the like); perinone pigments such as C.I. Pigment Red 194 (Perinone Red and the like); perylene pigments such as C.I. Pigment Red 149, C.I. Pigment Red 179, C.I. Pigment Red 178, C.I. Pigment Red 190, C.I. Pigment Red 224, C.I. Pigment Red 123 and C.I. pigment red 224; quinacridone pigments such as C.I. Pigment Violet 19 (unsubstituted quinacridone), C.I. Pigment Red 122, C.I. Pigment Red 262, C.I. Pigment Red 207 and C.I. Pigment Red 209; isoindolinone pigments such as C.I. Pigment Red 180 (Isoindolinone Red 2BLT and the like); alizarin lake pigments such as C.I. Pigment Red 83 (Madder Lake and the like); naphtholone pigments such as C.I. Pigment Red 171, C.I. Pigment Red 175, C.I. Pigment Red 176, C.I. Pigment Red 185 and C. I. Pigment Red 208; naphthol AS-based lake pigments such as C.I. Pigment Red 247; naphthol AS pigments such as C. I. Pigment Red 2, C.I. Pigment Red 5, C.I. Pigment Red 21, C.I. Pigment Red 170, C.I. Pigment Red 187, C.I. Pigment Red 256, C.I. Pigment Red 268, C.I. Pigment Red 269 and diketopyrrolopyrrole pigments such as C.I. Pigment Red 254, C.I. Pigment Red 255, C.I. Pigment Red 264 and C.I. Pigment Red 272.

The cyan pigment is a pigment which assumes blue or cyan color, and includes, for example, disazo-based pigments such as C.I. Pigment Blue 25 (Dianisidine Blue and the like); phthalocyanine pigments such as C. I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:6, C.I. Pigment Blue 16 (Copper Phthalocyanine Blue and the like); acid dye lake pigments such as C.I. Pigment Blue 24 (Peacock Blue Lake and the like); basic dye lake pigments such as C.I. Pigment Blue 1 (Victoria Pure Blue BO Lake and the like); anthraquinone-based pigments such as C.I. Pigment Blue 60 (Indanthrone Blue and the like); alkali blue pigments such as C. I. Pigment Blue 18 (Alkali Blue V-5:1).

The green pigment is a pigment which assumes green, and includes, for example, phthalocyanine pigments such as C.I. Pigment Green 7 (Phthalocyanine Green) and C.I. Pigment Green 36 (Phthalocyanine Green); azo metal complex pigments such as C.I. Pigment Green 8 and C.I. Pigment Green 10.

The orange pigment is a pigment which assumes orange, and includes, for example, isoindoline-based pigments such as C.I. Pigment Orange 66 (Isoindoline Orange); anthraquinone-based pigments such as C.I. Pigment Orange 51 (Dichloro pyranthorone orange); β-naphthol pigments such as C.I. Pigment Orange 2, C.I. Pigment Orange 3 and C.I. Pigment Orange 5; naphthol AS pigments such as C.I. Pigment Orange 4, C.I. Pigment Orange 22, C.I. Pigment Orange 24, C.I. Pigment Orange 38 and C.I. Pigment Orange 74; isoindolinone pigments such as C.I. Pigment Orange 61; perinone pigments such as C.I. Pigment Orange 43; disazo pigments such as C.I. Pigment Orange 15 and C.I. Pigment Orange 16; quinacridone pigments such as C.I. Pigment Orange 48 and C.I. Pigment Orange 49; acetolone pigments such as C.I. Pigment Orange 36, C.I. Pigment Orange 62, C.I. Pigment Orange 60, C.I. Pigment Orange 64 and C.I. Pigment Orange 72; and pyrazolone pigments such as C.I. Pigment Orange 13 and C.I. Pigment Orange 34.

The brown pigment is a pigment which assumes brown, and includes, for example, naphtholone pigments such as C.I. Pigment Brown 25 and C.I. Pigment Brown 32.

The violet pigment is a pigment which assumes purple, and includes, for example, naphtholone pigments such as C.I. Pigment Violet 32; perylene pigments such as C.I. Pigment Violet 29; naphthol AS pigments such as C.I. Pigment Violet 13, C.I. Pigment Violet 17 and C.I. Pigment Violet 50; and dioxazine pigments such as C.I. Pigment Violet 23 and C.I. Pigment Violet 37.

The black pigment is a pigment which assumes black, and includes, for example, carbon black and titanium black; indazine pigments such as and the C.I. Pigment Black 1 (Aniline Black); and perylene pigments such as C.I. Pigment Black 31 and C.I. Pigment Black 32.

The white pigments include, for example, basic lead carbonate ($2PbCO_3Pb(OH)_2$, a so-called silver white), zinc oxide (ZnO, a so-called zinc white), titanium oxide ($TiO_2$, a so-called titanium white) and strontium titanate ($SrTiO_3$, a so-called a titanium strontium white). Inorganic particles used for a white pigment may be a simple substance, or may be complex particles with oxides of silicon, aluminum, zirconium or titanium, or with organometallic compounds and an organic compound.

Among them, since titanium oxide has a low specific gravity as compared with other white pigments and has a high refractive index, is chemically and physically stable, and is excellent in the covering power and coloring power as a pigment, and further, the durability in acidic, alkaline and other environment, titanium oxide is preferably used. Other white pigments (may be white pigments other than the above white pigments) may be used together with titanium oxide in combination.

In dispersing these pigments, for example, dispersion apparatuses such as a ball mill, sand mill, attritor, roll mill, jet mill, homogenizer, paint shaker, kneader, agitator, Henschel mixer, colloid mill, ultrasonic homogenizer, pearl mill and wet jet mill may be preferably used.

In the invention, when dispersing a pigment, the above specific polymer compound (a) is added.

Further, when dispersing a pigment, a synergist may be added according to various pigments as a auxiliary agent of dispersion, if needed.

The content of the auxiliary agent of dispersion in the pigment dispersion is preferably from 1 part by mass to 50 parts by mass relative to 100 parts by mass of the pigment (b).

Although the average particle diameter of pigment particles is not specifically restricted, it may be appropriately selected in accordance with the intended purpose. Since the color-forming property becomes better as the particle diameter becomes small, the average particle diameter is preferably from about 0.01 µm to 0.4 µm, and more preferably from 0.02 µm to 0.2 µm. Further, the maximum diameter of pigment particles is preferably 3 µm, and is more preferably 1 µm. The size of pigment particle can be suitably adjusted by selecting the kind of pigments, dispersants and dispersion media, and the setting of dispersion conditions and filtration conditions and the like. When the pigment dispersion of the invention is applied to the ink composition for the inkjet use by controlling the size of pigment particles, clogging of a head nozzle can be suppressed, and the storability of ink, the transparency of ink and the curing sensitivity can be secured.

In addition, the diameter of pigment particles in the pigment dispersion and the ink composition can be measured by a known measuring method. Specifically, the diameter of pigment particles can be measured by the centrifugal sedimentation light transmission method, the X ray transmission method, the laser diffraction and scattering method or the dynamic light scattering method.

<Dispersion Medium>

In the invention, although the dispersion medium used when dispersing the pigment (b) is not specifically restricted, and the dispersion medium can be suitably selected in accordance with the intended use, for example, a low molecular weight polymerizable compound may be used as the dispersion medium, or a solvent is used as the dispersion medium. However, since the ink composition of the invention is radiation-curable type ink composition, it is preferable that the ink composition does not contain a non-curable solvent, in order to cure the ink composition after the ink is applied onto a recording medium. This is because when a solvent remains in a cured ink image, the resistance to solvent may be deteriorated, or problem such as VOS (volatile organic solvent) due to residual solvent may arise. For this reason, it is preferable that a polymerizable compound, which will be described later, is used as the dispersion medium, and a polymerizable compound with the lowest viscosity is selected from polymerizable compounds from the viewpoint of improving the dispersiblity and the handling characteristics of the ink composition.

The pigment dispersion of the invention contains a specific polymer compound (a) and a pigment (b), and can provide a pigment dispersion which has a clear color tone. It can be assumed that this is because the specific polymer compound (a) can improve the dispersibility and dispersion stability of pigment.

[Ink Composition]

The ink composition of the invention includes the above pigment dispersion of the invention, i.e., the specific polymer compound (a) and the pigment (b).

Since the ink composition of the invention includes the pigment dispersion containing the specific polymer compound (a), the ink composition is excellent in pigment dispersibility and dispersion stability, and even when fine particles of pigment is used, a homogeneous and stable ink composition can be obtained.

In such an ink composition, pigment functions as a coloring material, and pigment particles with a minute particle size are dispersed homogeneously and stably in the ink composition owing to the function of the specific polymer compound (a). As a result, the ink composition of the invention is excellent in color forming performance, and has a clear color tone and a high coloring power; whereby a high quality image can be obtained.

The ink composition of the invention can be used for various uses, such as oily ink, aqueous ink and curable ink.

In particular, since the ink composition of the invention excels in the dispersibility and stability of fine pigment particles, it is preferable that the ink composition is applied to a curable ink, and in particular, of the curable inks, it is preferable that the ink composition is applied to the inkjet use.

It is preferable that the content of the pigment in the ink composition of the invention is in the following ranges in use.

That is, when the pigment is an organic pigment, the content of the organic pigment in the ink composition is preferably from 1% by mass to 20% by mass, and more preferably from 2% by mass to 10% by mass in terms of solid content.

Further, when the pigment is an inorganic pigment, the content of the inorganic pigment in the ink composition is preferably from 1% by mass to 30% by mass, and more preferably from 2% by mass to 25% by mass in terms of solid content.

Hereinafter, the case where the ink composition of the invention is applied to a curable ink as a suitable use of the ink composition will be explained in detail. In addition, the ink composition of the invention is not limited to the use and the embodiment.

The ink composition of the invention may contain other components appropriately selected in addition to the pigment dispersion of the invention, if needed. As the preferable other components, a polymerizable compound (c) and a photopolymerization initiator (d) may be exemplified, and the ink composition of the invention, in which these components are contained, can be cured upon irradiation with an actinic energy ray.

The actinic energy ray for curing the ink composition of the invention is not specifically restricted, as long as the actinic energy ray imparts energy capable of generating an initiation species for a curing reaction in the ink composition upon the irradiation with the ray, and can be selected in accordance with the intended purpose. For example, the actinic energy rays include α-ray, γ-rays, X-rays, ultraviolet rays, visible light, electron beams and the like. In the invention, the ultraviolet ray and electron beam are preferable, from the viewpoint of the curing sensitivity and the availability of devices, and in particular, the ultraviolet ray is preferable.

Hereafter, the constitutional component in the case where the ink composition of the invention is applied to a curable ink is explained.

<(c) Polymerizable Compound>

The polymerizable compound (c) is not specifically restricted, but can be suitably selected in accordance with the intended use, as long as the polymerizable compound is cured by a polymerization reaction caused by applying stimulus from the outside, for example, energy to the polymerizable compound. As the polymerizable compound, a monomer, oligomer and polymer may be used irrespective of the kind of the polymerizable compound. However, various polymerizable monomers known as a photocationic polymerizable monomer and a photoradical polymerizable monomer which give rise to a polymerization reaction with a polymerization initiation species generated from a photopolymerization initiator (d), which will be described later, are preferable.

—Photocationic Polymerizable Monomer—

Preferable examples of the photocationic polymerizable monomer which can be used as a polymerizable compound (c) include, for example, an epoxy compound, vinylether compound, oxetane compound and the like as recited in JP-A Nos. 6-9714, 2001-31892, 2001-40068, 2001-55507, 2001-310938, 2001-310937 and 2001-220526.

The above epoxy compound may be a monofunctional epoxy compound, or may be a polyfunctional epoxy compound.

Examples of monofunctional epoxy compounds include, for example, phenyl glycidyl ether, p-tert-butylphenyl glycidyl ether, butyl glycidyl ether, 2-ethyl hexyl glycidyl ether, allyl glycidyl ether, 1,2-butylene oxide, 1,3-butadiene monooxide, 1,2-epoxy dodecane, epichlorohydrin, 1,2-epoxy decane, styrene oxide, cyclohexene oxide, 3-methacryloyloxy methylcyclohexene oxide, 3-acryloyloxy methylcyclohexene oxide, 3-vinyl cyclohexene oxide and the like.

Examples of polyfunctional epoxy compounds include, for example, bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolak resin, hydrogenated bisphenol A diglycidyl ether, hydrogenated bisphenol F diglycidyl ether, hydrogenated bisphenol S diglycidyl ether, 3,4-epoxycyclohexyl methyl-3',4'-epoxycyclohexane carboxylate, 2-(3,4-epoxycyclohexyl 5,5-spiro-3,4-epoxy)cyclohexane-meta-dioxane, bis(3,4-epoxy cyclohexylmethyl)adipate, vinyl cyclohexeneoxide, 4-vinyl epoxycyclohexane, bis(3,4-epoxy-6-methyl cyclohexyl methyl)adipate, 3,4-epoxy 6-methyl cyclohexyl-3',4'-epoxy-6'-methylcyclohexane carboxylate, methylene bis(3,4-epoxycyclohexane), dicyclopentadiene diepoxide, di(3,4-epoxycyclohexylmethyl)ether of ethylene glycol, ethylene bis(3,4-epoxycyclohexane carboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylol propane triglycidyl ether, polyethyleneglycol diglycidyl ether, polypropyleneglycol diglycidyl ethers, 1,1,3-tetradecadiene dioxide, limonene dioxide, 1,2,7,8-diepoxyoctane, 1,2,5,6-diepoxycyclooctane and the like.

Among these epoxy compounds, an aromatic epoxy compound and an alicyclic epoxy compound are preferable, and in particular, an alicyclic epoxy compound is preferable in view of excellent curing speed.

The above vinylether compound may be a monofunctional vinylether compound, or may be a polyfunctional vinylether compound.

Examples of the monofunctional vinylether compound include, for example, methyl vinylether, ethyl vinylether, propyl vinylether, n-butyl vinylether, t-butyl vinylether, 2-ethylhexyl vinylether, n-nonylvinylether, lauryl vinylether, cyclohexyl vinylether, cyclohexylmethyl vinylether, 4-methyl cyclohexylmethyl vinylether, benzylvinylether, dicyclopentenyl vinylether, 2-dicyclopentenoxyethyl vinylether, methoxyethyl vinylether, ethoxyethyl vinylether, butoxyethyl vinylether, methoxyethoxyethyl vinylether, ethoxyethoxyethyl vinylether, methoxypolyethyleneglycol vinylether, tetrahydrofurfuryl vinylether, 2-hydroxyethyl vinylether, 2-hydroxypropyl vinylether, 4-hydroxybutyl vinylether, 4-hydroxymethyl cyclohexyl methyl vinylether, diethyleneglycol monovinylether, polyethyleneglycol vinylether, chloroethyl vinylether, chlorobutyl vinylether, chloroethoxyethyl vinylether, phenylethyl vinylether, phenoxy polyethyleneglycol vinylether and the like.

Examples of the polyfunctional vinylether compounds include, for example, divinylethers such as ethyleneglycol divinylether, diethyleneglycol divinylether, triethyleneglycol divinylether, polyethyleneglycol divinylether, propyleneglycol divinylether, butyleneglycol divinylether, hexanediol divinylether, bisphenol A alkyleneoxide divinylether, bisphenol F alkyleneoxide divinylether; polyfunctional vinylethers such as trimethylolethane trivinylether, trimethylolpropane trivinylether, ditrimethylolpropane tetravinylether, glycerin trivinylether, pentaerythritol tetravinylether, dipenthaerythritol pentavinylether, dipentaerythritol hexavinylether, ethyleneoxide adduct of trimethylolpropane trivinylether, propylene oxide adduct of trimethylolpropane trivinylether, ethylene oxide adduct of ditrimethylolpropane tetravinylether, propylene oxide adduct of di(trimethylolpropane) tetravinylether, ethylene oxide adduct of pentaerythritol tetravinylether, propylene oxide adduct of pentaerythritol tetravinylether, ethylene oxide adduct dipentaerythritol hexavinylether, propylene oxide adduct of dipentaerythritol hexavinylether, and the like.

Among these vinylether compounds, in view of the curability, the adhesiveness with a recording medium and the hardness of the surface of formed image, a di- or trivinylether compound is preferable, and in particular, the divinylether compound is preferable.

The oxetane compound refers to a compound which has an oxetane ring, and known oxetane compounds as recited in JP-A Nos. 2001-220526, 2001-310937 and 2003-341217.

In the invention, as the oxetane compound, the compound having 1 to 4 oxetane rings in the structure is preferable. The use of such a compound is advantageous in that the viscosity of an ink composition can be easily maintained in a favorable range for handling characteristics, and high adhesiveness of ink after being cured with a recording medium can be obtained.

The oxetane compound may be a monofunctional oxetane compound, or may be a polyfunctional oxetane compound.

Examples of the monofunctional oxetane compound include, for example, 3-ethyl-3-hydroxymethyl oxetane, 3-(meth)allyloxymethyl-3-ethyl oxetane, (3-ethyl-3-oxetanylmethoxy)methyl benzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenyl ether, isobutoxymethyl (3-ethyl-3-oxetanylmethyl)ether, isobornyloxyethyl (3-ethyl-3-oxetanylmethyl)ether, isobornyl (3-ethyl-3-oxetanylmethyl)ether, 2-ethylhexyl (3-ethyl-3-oxetanylmethyl) ether, ethyl diethyleneglycol (3-ethyl-3-oxetanylmethyl) ether, dicyclopentadiene (3-ethyl-3-oxetanylmethyl)ether, dicyclopentenyloxyethyl (3-ethyl-3-oxetanylmethyl)ether, dicyclopentenyl (3-ethyl-3-oxetanylmethyl)ether, tetrahydrofurfuryl (3-ethyl-3-oxetanylmethyl)ether, tetrabromophenyl (3-ethyl-3-oxetanylmethyl)ether, 2-tetrabromophenoxy ethyl (3-ethyl-3-oxetanylmethyl)ether, tribromophenyl (3-ethyl-3-oxetanylmethyl)ether, 2-tribromophenoxy ethyl (3-ethyl-3-oxetanylmethyl)ether, 2-hydroxy ethyl (3-ethyl-3-oxetanylmethyl)ether, 2-hydroxypropyl (3-ethyl-3-oxetanylmethyl)ether, butoxyethyl (3-ethyl-3-oxetanylmethyl)ether, pentachlorophenyl (3-ethyl-3-oxetanylmethyl)ether, pentabromophenyl (3-ethyl-3-oxetanylmethyl)ether, bornyl (3-ethyl-3-oxetanylmethyl)ether and the like.

Moreover, examples of the polyfunctional oxetane compounds include, for example, 3,7-bis(3-oxetanyl)-5-oxanonane, 3,3'-(1,3-(2-methylenyl)propanediyl bis(oxymethylene))bis-(3-ethyloxetane), 1,4-bis [(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethyleneglycol bis(3-ethyl-3-oxetanylmethyl)ether, dicyclopentenyl bis(3-ethyl-3-oxetanylmethyl)ether, triethyleneglycol bis(3-ethyl-3-oxetanylmethyl)ether, tetraethyleneglycol bis(3-ethyl-3-oxetanylmethyl)ether, tricyclodecanediyl dimethylene (3-ethyl-3-oxetanylmethyl)ether, trimethylolpropane tris(3-ethyl-3-oxetanylmethyl)ether, 1,4-bis(3-ethyl-3-oxetanylmethoxy)butane, 1,6-bis(3-ethyl-3-oxetanylmethoxy)hexane, pentaerythritol tris(3-ethyl-3-oxetanylmethyl)ether, pentaerythritol tetrakis (3-ethyl-3-oxetanylmethyl)ether, polyethylene glycol bis(3-ethyl-3-oxetanylmethyl)ether, dipentaerythritol hexakis(3-ethyl-3-oxetanylmethyl)ether, dipentaerythritol pentakis (3-ethyl-3-oxetanylmethyl)ether, dipentaerythritol tetrakis(3-ethyl-3-oxetanylmethyl)ether, caprolactone-modified dipentaerythritol hexakis(3-ethyl-3-oxetanylmethyl)ether, caprolactone-modified dipentaerythritol pentakis(3-ethyl-3-oxetanylmethyl)ether, ditrimethylolpropane tetrakis(3-ethyl-3-oxetanylmethyl)ether, EO-modified bisphenol A bis(3-ethyl-3-oxetanylmethyl) ether, PO-modified bisphenol A bis(3-ethyl-3-oxetanylmethyl)ether, EO-modified hydrogenated bisphenol A bis(3-ethyl-3-oxetanylmethyl)ether, PO-modified hydrogenated bisphenol A bis(3-ethyl-3-oxetanylmethyl)ether, EO-modified bisphenol F (3-ethyl-3-oxetanylmethyl)ether and the like.

Further, as the oxetane compounds, in addition to the above, compounds as recited in detail in Paragraph Numbers [0021] to [0084] of JP-A No. 2003-341217, can also be suitably used in the invention.

Among the above oxetane compounds, in the invention, oxetane compounds having 1 to 2 oxetane rings are preferable in view of the viscosity of the ink composition and the adhesiveness.

In the ink composition of the invention, although one kind of the photocationic polymerizable monomer may be used alone, or two or more kinds thereof may be used together, it is preferable to use together at least one kind of oxetane compounds and at least one kind of compounds selected from epoxy compounds and vinylether compounds, from the viewpoint of effectively preventing the contraction at the time of ink curing.

—Photoradical Polymerizable Monomer—

As a photoradical polymerizable monomer which can be used as a polymerizable compound (c), for example, (meth)acrylates, (meth)acrylamides, and aromatic vinyls are exemplified. In addition, in this specification, "(meth)acrylate" refers to both or one of "acrylate" and "methacrylate", and "(meth)acrylic" refers to both or one of "acrylic" or "methacrylic".

The (meth)acrylates may be monofunctional (meth)acrylates, or may be polyfunctional (meth)acrylates.

Examples monofunctional (meth)acrylates include, for example, hexyl (meth)acrylate, 2-ethylhexyl (meth)acrylate, tert-octyl (meth)acrylate, isoamyl (meth)acrylate, decyl (meth)acrylate, isodecyl (meth)acrylate, stearyl (meth)acrylate, isostearyl (meth)acrylate, cyclohexyl (meth)acrylate, 4-n-butylcyclohexyl (meth)acrylate, bornyl (meth)acrylate, isobornyl (meth)acrylate, benzyl (meth)acrylate, 2-ethylhexyldiglycol (meth)acrylate, butoxyethyl (meth)acrylate, 2-chloroethyl (meth)acrylate, 4-bromobutyl (meth)acrylate, cyanoethyl (meth)acrylate, benzyl (meth)acrylate, butoxymethyl (meth)acrylate, 3-methoxybutyl (meth)acrylate, alkoxymethyl (meth)acrylate, alkoxyethyl (meth)acrylate, 2-(2-methoxyethoxy)ethyl (meth)acrylate, 2-(2-butoxyethoxy)ethyl (meth)acrylate, 2,2,2-tetrafluoroethyl (meth) acrylate, 1H, 1H, 2H, 2H perfluorodecyl (meth)acrylate, 4-butylphenyl (meth)acrylate, phenyl (meth)acrylate, 2,4,5-tetramethylphenyl (meth)acrylate, 4-chlorophenyl (meth) acrylate, phenoxymethyl (meth)acrylate, phenoxyethyl (meth)acrylate, glycydyl (meth)acrylate, glycidyloxybutyl (meth)acrylate, glycidyloxyethyl (meth)acrylate, glycidyloxypropyl (meth) acrylate, tetrahydrofurfuryl (meth)acrylate, hydroxyalkyl (meth)acrylate, 2-hydroxyethyl (meth)acrylate, 3-hydroxypropyl (meth)acrylate, 2-hydroxypropyl (meth)acrylate, 2-hydroxybutyl (meth)acrylate, 4-hydroxybutyl (meth)acrylate, 3-hydroxypropyl (meth)acrylate, dimethylaminoethyl (meth)acrylate, diethylaminoethyl (meth)acrylate, dimethylaminopropyl (meth)acrylate, diethylaminopropyl (meth)acrylate, trimethoxysilylpropyl (meth)acrylate, trimethylsilylpropyl (meth)acrylate, polyethyleneoxide monomethyl ether (meth)acrylate, oligoethyleneoxide monomethylether (meth)acrylate, polyethyleneoxide (meth)acrylate, oligoethyleneoxide (meth)acrylate, oligoethyleneoxide monoalkylether (meth)acrylate, polyethyleneoxide monoalkylether (meth)acrylate, dipropyreneglycol (meth)acrylate, polypropyleneoxide monoalkylether (meth)acrylate, oligopropyleneoxide monoalkylether (meth)acrylate, 2-methacryloyloxyethyl succinate, 2-methacrylyloyloxy hexahydrophthalate, 2-methacryloyloxyethyl-2-hydroxypropyl phthalate, butoxydiethylene glycol (meth)acrylate, trifluoroethyl (meth)acrylate, perfluorooctyl ethyl (meth)acrylate, 2-hydroxy-3-phenoxypropyl (meth)acrylate, EO-modified phenol (meth)acrylate, EO-modified cresol (meth)acrylate, EO-modified nonylphenol (meth)acrylate, PO-modified nonylphenol (meth)acrylate, EO-modified-2-ethylhexyl (meth)acrylate, dicyclopentenyl (meth)acrylate, dicyclopentanyl (meth)acrylate, dicyclopentenyloxyethyl (meth)acrylate and the like.

As the polyfunctional (meth)acrylates, bifunctional, trifunctional, tetrafunctional, pentafunctional and hexafunctional (meth)acrylates are exemplified.

Examples of the bifunctional (met)acrylates include, for example, 1,6-hexanediol di(meth)acrylate, 1,10-decanediol di(meth)acrylate, neopentylglycol di(meth)acrylate, 2,4-dimethyl-1,5-pentanediol di(meth)acrylate, butylethyl propanediol (meth)acrylate, ethoxylated cyclohexane methanol di(meth)acrylate, polyethylene glycol di(meth)acrylate, oligoethyleneglycol di(meth)acrylate, ethyleneglycol di(meth)acrylate, 2-ethyl-2-butyl-butanediol di(meth)acrylate, neopentylglycol hydroxypivalate di(meth)acrylate, EO-modified bisphenol A di(meth)acrylate, bisphenol F polyethoxy di(meth)acrylate, polypropyleneglycol di(meth)acrylate, oligopropyleneglycol di(meth)acrylate, 1,4-butanediol di(meth)acrylate, 2-ethyl-2-butylpropanediol di(meth)acrylate, 1,9-nonane di(meth)acrylate, propoxylated ethoxylated bisphenol A di(meth)acrylate, tricyclodecane di(meth)acrylate, dipropyleneglycol di(meth)acrylate, propoxylated neopentyl glycol di(meth)acrylate and the like.

Examples of the trifunctional (meth)acrylates include, for example, trimethylol propane tri(meth)acrylate, trimethylol ethane tri(meth)acrylate, alkyleneoxide-modified tri(meth)acrylate of trimethylolpropane, pentaerythritol tri(meth)acrylate, dipentaerythritol tri(meth)acrylate, trimethylolpropane tri((meth)acryloyloxypropyl)ether, alkyleneoxide-modified isocyanurate tri(meth)acrylate, dipentaerythritol propionate tri(meth)acrylate, tri((meth)acryloyloxyethyl)isocyanurate, hydroxypivalaldehyde-modified dimethylolpropane tri (meth)acrylate, sorbitol tri(meth)acrylate, propoxylated trimethylolpropane tri(meth)acrylate, ethoxylated glycerin triacrylate and the like.

Examples of the tetrafunctional (meth)acrylates include, for example, pentaerythritol tetra(meth)acrylate, sorbitol tetra(meth)acrylate, ditrimethylolpropane tetra(meth)acrylate, dipentaerythritol propionate tetra(meth)acrylate, ethoxylated pentaerythritol tetra(meth)acrylate and the like.

Examples of the pentafunctional (meth)acrylates include, for example, sorbitol penta(meth)acrylate and dipentaerythritol penta(meth)acrylate.

Examples of hexafunctional (meth)acrylates include, for example, dipentaerythritol hexa(meth)acrylate, sorbitol hexa(meth)acrylate, alkylene oxide-modified hexa(meth)acrylate of phosphazene, captolactone-modified dipentaerythritol hexa(meth)acrylate and the like.

Examples of the (meth)acrylamides include, for example, (meth)acrylamide, N-methyl (meth)acrylamide, N-ethyl (meth)acrylamide, N-propyl (meth)acrylamide, N-n-butyl (meth)acrylamide, N-t-butyl (meth)acrylamide, N-butoxymethyl (meth)acrylamide, N-isopropyl (meth)acrylamide, N-methylol (meth)acrylamide, N,N-dimethyl (meth)acrylamide, N,N-diethyl (meth)acrylamide, (meth)acryloyl morpholine and the like.

Examples of the aromatic vinyls include, for example, styrene, methyl styrene, dimethyl styrene, trimethyl styrene, ethyl styrene, isopropyl styrene, chloromethyl styrene, methoxy styrene, acetoxy styrene, chlorostyrene, dichlorostyrene, bromostyrene, methyl vinyl benzoate, 3-methyl styrene, 4-methyl styrene, 3-ethyl styrene, 4-ethyl styrene, 3-propylstyrene, 4-propyl styrene, 3-butyl styrene, 4-butyl styrene, 3-hexylstyrene, 4-hexyl styrene, 3-octyl styrene, 4-octyl styrene, 3-(2-ethylhexyl)styrene, 4-(2-ethylhexyl)styrene, allylstyrene, isopropenyl styrene, butenyl styrene, octenyl styrene, 4-t-butoxycarbonyl styrene, 4-methoxy styrene, 4-t-butoxy styrene and the like.

Examples of the photoradical polymerizable monomer further include, vinyl esters [vinyl acetate, vinyl propionate and vinyl versatate], allyl esters [allyl acetate], halogen-containing monomers [vinylidene chloride and vinyl chloride], vinylethers [methyl vinylether, butyl vinylether, hexyl vinylether, methoxy vinylether, 2-ethylhexyl vinylether, methoxyethyl vinylether, cyclohexyl vinylether, chloroethyl vinylether and triethylene glycol divinylether], cyanated vinyls [(meth)acrylonitrile], olefins [ethylene and propylene], and the like.

Among them, from the viewpoint of curing speed, (meth)acrylates and (meth)acrylamides are preferable, and tetrafunctional or higher functional (meth)acrylate is more preferable, and from the viewpoint of the viscosity of ink composition, a polyfunctional (meth)acrylate is preferably used in combination with a monofunctional (meth)acrylate or bifunctional (meth)acrylate or a (meth)acrylamide.

In the ink composition of the invention, the content of the polymerizable compound (c), is preferably 50% by mass to 95% by mass, more preferably 60% by mass to 92% by mass, and particularly preferably 70% by mass to especially 90% by mass relative to the total mass of the ink composition.

The polymerizable compound (c) may be used alone, or two or more kinds thereof may used together for the purpose of adjusting the reaction rate, the physical properties of ink, the physical properties of cured film and the like.

Further, the polymerizable compound (c) may be a monofunctional compound or may be a polyfunctional compound.

<(d) Photopolymerization Initiator>

It is preferable that the ink composition of the invention contains a polymerization initiator.

The polymerization initiator may be selected according to polymerizable compounds (c), and a radical polymerizable or cationic polymerizable polymerization initiator is preferable, and in particular, a photopolymerization initiator (d) is preferable.

The photopolymerization initiator (d) is a compound which generates at least one of a radical, an acid and a base as an active species by a chemical change through the action of light or the interaction with excited states of the electron of a sensitizing dye.

As the photopolymerization initiator sensitive to an actinic ray to be irradiated, for example, an initiator which is sensitive to an ultraviolet ray in the range of wavelength of from 400 nm to 200 nm, far ultraviolet rays, the g-line, the h-line, the i-line, the KrF excimer laser beam, the ArF excimer laser beam, electron beams, X-rays, molecular beams or ion beams, may be appropriately selected and used.

Example of the photopolymerization initiator (d) include compounds as recited in "Chemical Revue", 93, 435 (1993) written by Bruce M. Monroe; "Journal of Photochemistry and Biology A: Chemistry" 73, 81 (1993) written by R. S. Davidson; "Photoinitiated Polymerization-Theory and Applications", Rapra Review Vol. 9, Report, Rapra Technology (1998) written by J. P. Faussier; Prog. Polym. Sci., 21, 1 (1996) (M. Tsunooka et al); and chemically amplifying photoresists or compounds used for photocationic polymerization as recited in "Organic Materials for Imaging" (pages 187-192) (1993) edited by Organic Electronic Material Study Group, published by Bunshin Publishing Co. Furthermore, compound which causes reductive or oxidative cleavage through an interaction with excited states of the electron of a sensitizing dye as recited in "Topics in Current Chemistry", 156, 59 (1990) written by F. D. Saeva; "Topics in Current Chemistry", 168, 1 (1993) written by G. G. Maslak; JACS, 112, 6329(1990) written by H. B. Shuster et al.; JACS 102, 3298 (1980) written by I. D. F. Eaton et al.

Among these photopolymerization initiators (d), (1) aromatic ketone compounds, (2) aromatic onium salt compounds, (3) organic peroxides, (4) hexaaryl biimidazole compounds, (4) ketoxime ester compounds, (5) borate compounds, (6) azinium compound, (7) metallocene compounds, (8) active ester compounds, (9) compounds having a carbon-halogen combination and the like can be especially suitably exemplified.

Examples of (1) the aromatic ketone compound include, for example, a compound having a benzophenone skeleton or a thioxanthone skeleton as recited on pages 77-117 of "Radiation Curing in Polymer Science and Technology" (1993) written by J. P. Fouassier and J. F. Rabek; α-thiobenzophenone compounds recited in Japanese Publication of Examined Patent Application (JP-B) No. 47-6416; benzoin ether compounds recited JP-B No. 47-3981; α-substituted benzoin compounds recited in JP-B No. 47-22326; benzoin derivatives recited in JP-B No. 47-23664; aroyl phosphate recited in JP-A No. 57-30704; dialkoxybenzophenones recited in JP-B No. 60-26483, benzoin ethers recited in JP-B No. 60-26403 and JP-A No. 62-81345; α-aminobenzophenones recited in JP-B No. 1-34242, U.S. Pat. No. 4,318,791 and European Patent Publication 0284561A1; p-di(dimethylaminobenzoyl) benzene recited in JP-A No. 2-211452; thio-substituted aromatic ketones recited in JP-A No. 61-194062; acyl phosphine sulfides recited in JP-B No. 2-9597; acyl phosphines recited in JP-B No. 2-9596; thioxanthones recited in JP-B No. 63-61950; coumalins recited in JP-B No. 59-42864; monoacyl phosphine oxide recited in JP-B Nos. 60-8047 and 63-40799; and bisacyl phosphine oxides recited in JP-A Nos. 3-101686, 5-345790 and 6-298818.

Examples of (2) the aromatic onium salt compounds include, for example, aromatic onium salts of the elements, specifically, N, P, As, Sb, Bi, O, S, Se, Te or I of the V, VI or VII group in the periodic table, and more specifically iodonium salts as recited in European Patent No. 104143, U.S. Pat. No. 4,837,124, JP-A Nos. 2-150848 and 2-96514; sulfonium salts, diazonium salts (benzenediazonium salts which may have a substituent) and diazonium salt resins (formaldehyde resins of diazodiphenylamines) as recited in European Patent Nos. 370693, 233567, 297443, 297442, 279210 and 422570, U.S. Pat. Nos. 3,902,144, 4,933,377, 4,760,013, 4,734,444 and 2,833,827; N-alkoxypyridinium salts (for example, compounds recited in U.S. Pat. No. 4,743,528, JP-A Nos. 63-138345, 63-142345 and 63-142346 and JP-B No. 46-42363, specifically, 1-methoxy-4-phenyl pyridinium tetrafluoroborate and the like); and compounds as recited in JP-B Nos. 52-147277, 52-14278 and 52-14279. These compounds generate a radical or an acid as active species.

Examples of (3) the organic peroxides include for example, an organic compound having one or more oxygen-oxygen combination in a molecule, and specifically, peroxide ester compounds such as 3,3',4,4'-tetra(t-butylperoxycarbonyl) benzophenone, 3,3', 4,4'-tetra(t-amylperoxycarbonyl)benzophenone, 3,3',4,4'-tetra(t-hexylperoxycarbonyl) benzophenone, 3,3',4,4'-tetra(t-octylperoxycarbonyl) benzophenone, 3,3', 4,4'-tetra(cumylperoxycarbonyl) benzophenone, 3,3', 4,4'-tetra(p-isopropylcumylperoxycarbonyl)benzophenone, di-t-butyl diperoxyisophthalate and the like.

Examples of (4) the hexaarylbiimidazole compounds include, for example, lophine dimers as recited in JP-B Nos. 45-37377 and 44-86516, and more specifically, 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl) biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, 2,2'-bis(o-trifluorophenyl)-4,4',5,5'-tetraphenlybiimidazole and the like.

Examples of (4) the ketoxime ester compounds include, for example, 3-benzoyloxyiminobutane-2-on, 3-acetoxyiminobutane-2-on, 3-propionyloxyiminobutane-2-on, 2-acetoxyiminopentane-3-on, 2-acetoxyimino-1-phenylpropane-1-on, 2-benzoyloxyimino-1-phenyl propane-1-on, 3-p-toluenesulfonyloxyiminobutane-2-on, 2-ethoxycarbonyloxyimino-1-phenylpropane-1-on and the like.

Examples of (5) the borate compounds include, for example, compounds as recited in U.S. Pat. Nos. 3,567,453, 4,343,891, and European Patent Nos. 109,772 and 109,773.

Examples of (6) the azinium compound include, for example, compounds having an N—O bond as recited in JP-A Nos. 63-138345, 63-142345,63-142346 and 63-143537, and JP-B No. 46-42363.

Examples of (7) the metallocene compounds include, for example, titanocene compounds as recited in JP-A Nos. 59-152396, 61-151197, 63-41484, 2-249 and 2-4705; ironarene complexes as recited in JP-A Nos. 1-304453 and 1-152109.

Examples of the titanocene compounds include, dicyclopentadienyl-Ti-dichloride, dicyclopentadienyl-Ti-bis-phenyl, dicyclopentadienyl-Ti-bis-2,3,4,5,6-pentafluoropheny-1-yl, dicyclopentadienyl-Ti-bis-2,3,5,6-tetrafluoropheny-1-yl, dicyclopentadienyl-Ti-bis-2,4,6-trifluoropheny-1-yl, dicyclopentadienyl-Ti-2,6-difluoropheny-1-yl, dicyclopentadienyl-Ti-bis-2,4-difluoropheny-1-yl, dimethylcyclopentadienyl-Ti-bis-2,3,4,5,6-pentafluoropheny-1-yl, dimethylcyclopentadienyl-Ti-bis-2,3,5,6-tetrafluoropheny-1-yl, dimethylcyclopentadienyl-Ti-bis-2,4-difluoropheny-1-yl, bis(cyclopentadienyl)-bis(2,6-difluoro-3-(pyri-1-yl)phenyl) titanium, bis(cyclopentadienyl)-bis[2,6-difluoro-3-(methylsulfonamide)phenyl]titanium, bis(cyclopentadienyl)-bis[2,6-difluoro-3-(N-butylbiaroylamino)phenyl]titanium and the like.

(8) The active ester compounds include, for example, nitrobenzyl ester compounds as recited in European Patent Nos. 0290750, 046083,156153, 271851 and 0388343, U.S. Pat. Nos. 3,901,710 and 4,181,531, JP-A Nos. 60-198538 and 53-133022; iminosulfonate compounds as recited in European Patent Nos. 0199672, 84515, 044115 and 0101122, U.S. Pat. Nos. 4,618,564, 4,371,605 and 4,431,774, JP-A Nos. 64-18143, 2-245756 and 4-365048; and compounds as recited in JP-B Nos. 62-6223 and 63-14340 and JP-A No. 59-174831.

Examples of (9) the compounds having a carbon-halogen bond include, for example, compounds as recited in Bull. Chem. Soc. Japan, 42, 2924 (1969) written by Wakabayashi et al., compounds recited in British Patent No. 1388492, compounds as recited in JP-A No. 53-133428, compounds as recited in German Patent No. 3337024, J. Org. Chem. 29, 1527 (1964) written by F. C. Schaefer, et al., compounds as recited in JP-A No. 62-58241, compounds recited in 5-281728, compounds recited in German Patent No. 2641100, compounds recited in German Patent No. 3333450, compounds recited in German Patent No. 3021590 and compounds recited in German Patent No. 3021599.

Preferred examples of the photopolymerization initiators (1) to (8) are as follows.

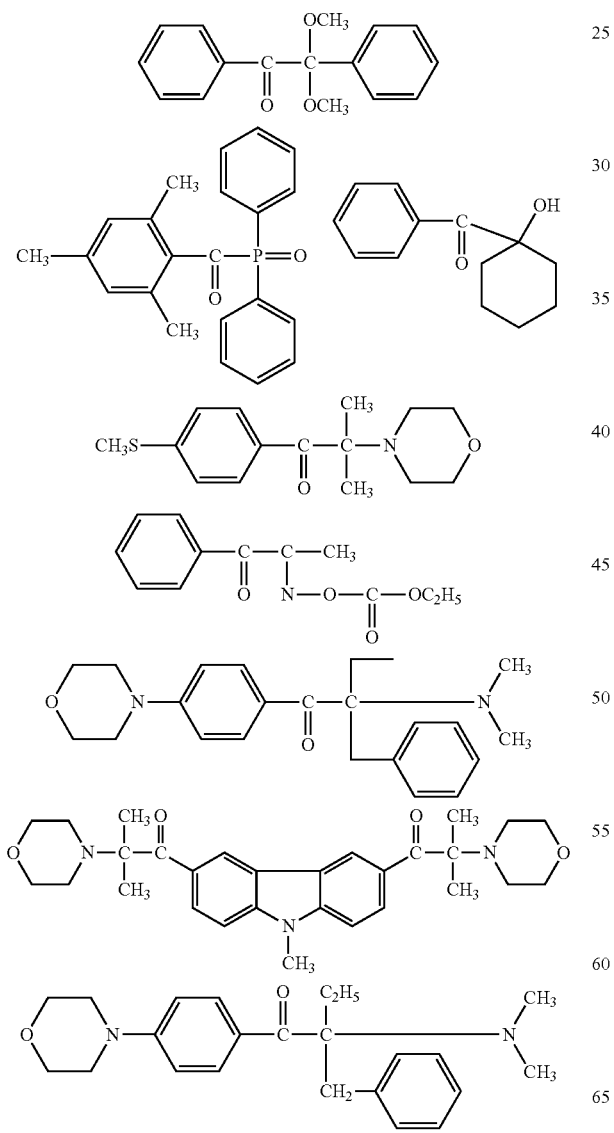
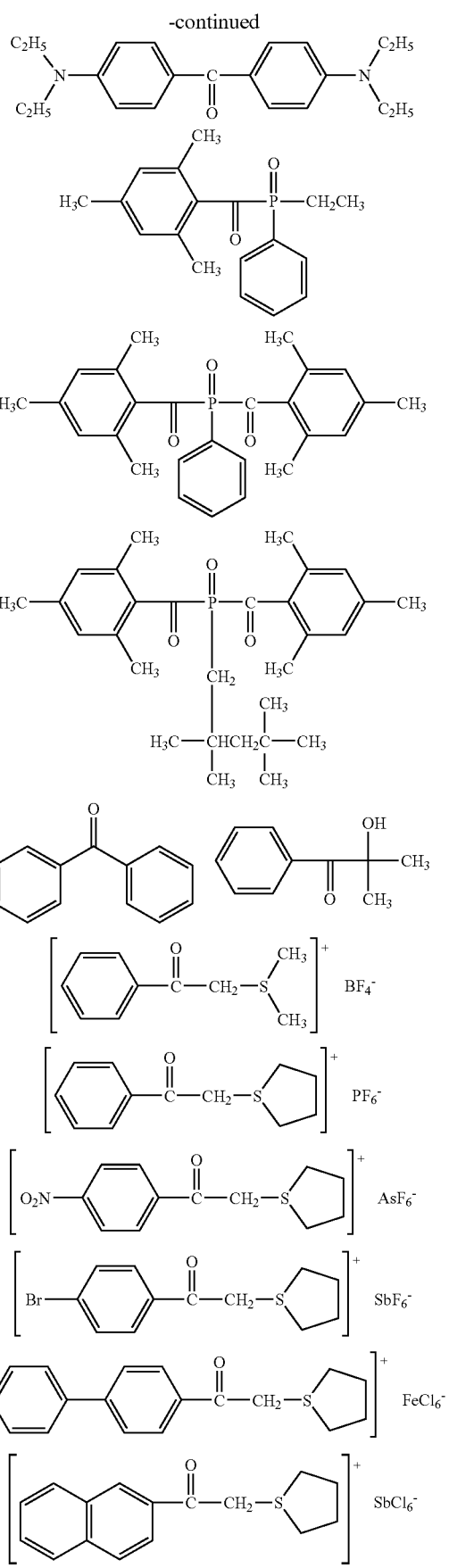

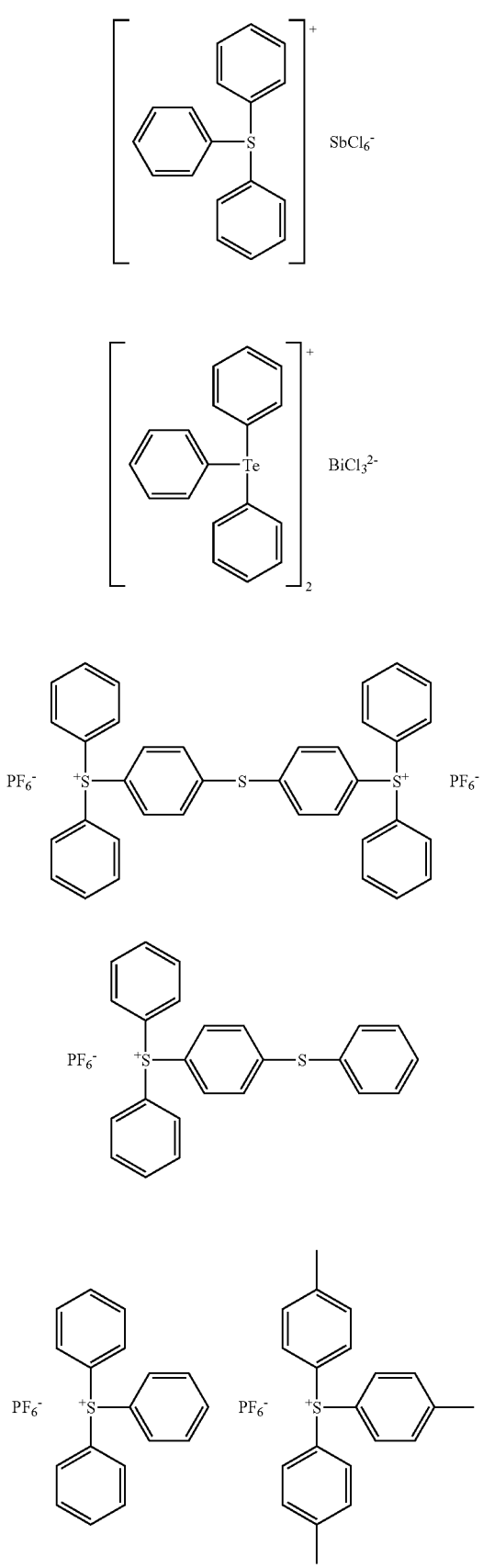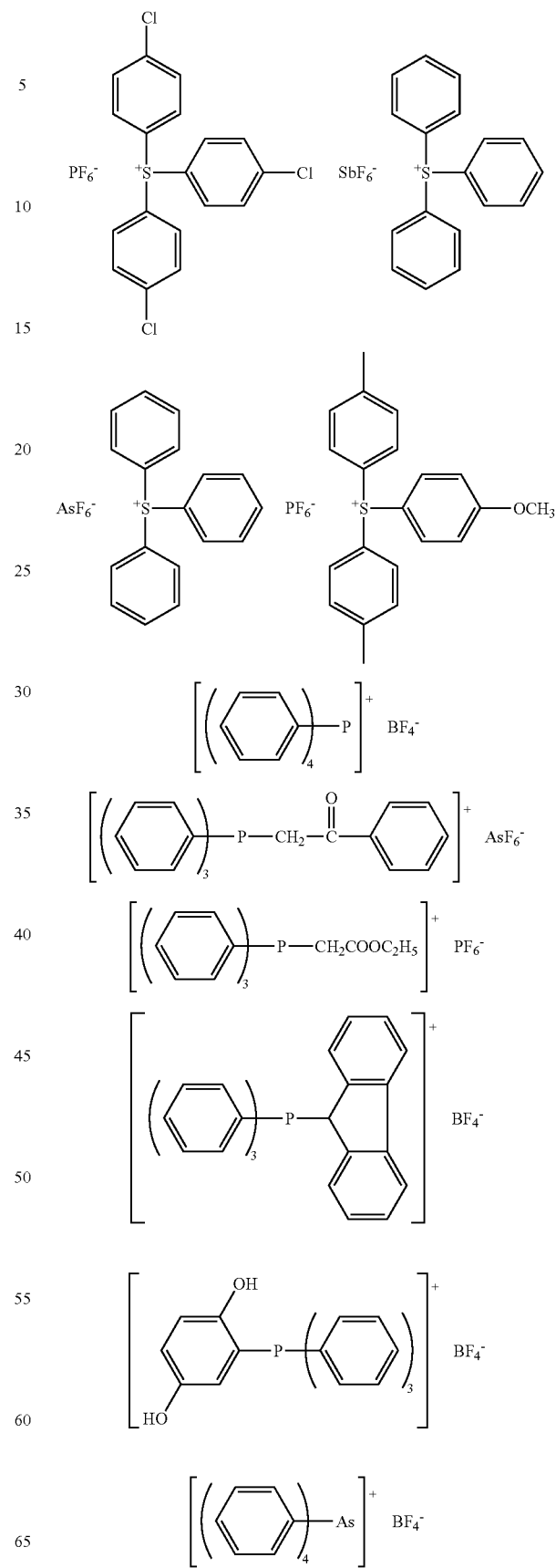

35
-continued
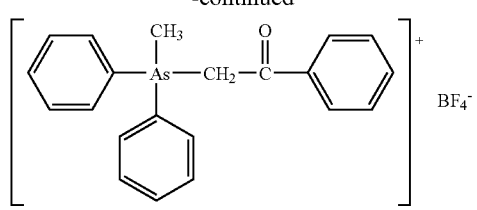
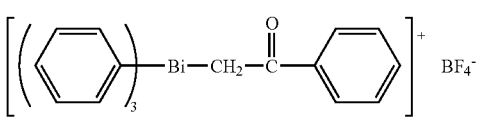
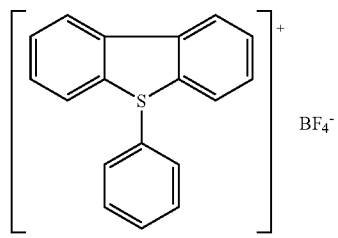
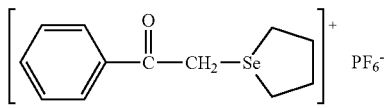
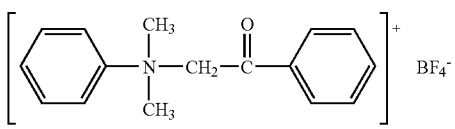
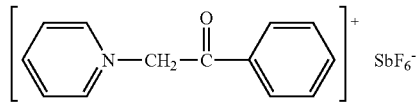
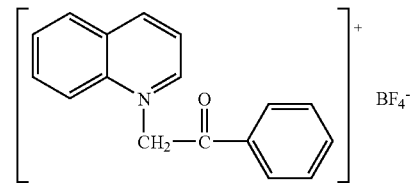
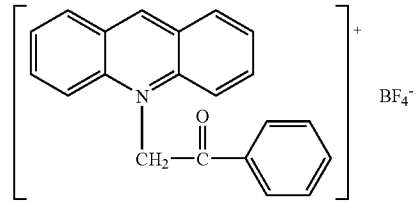
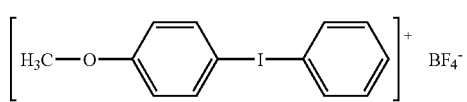
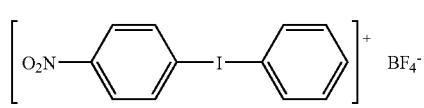
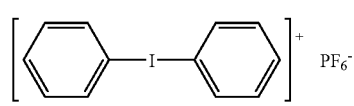
36
-continued
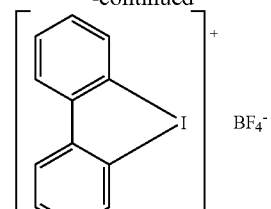
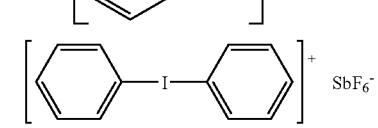
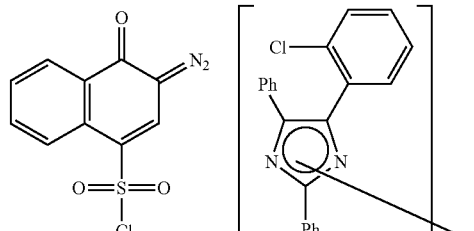
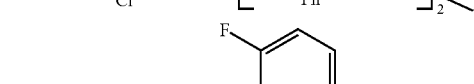
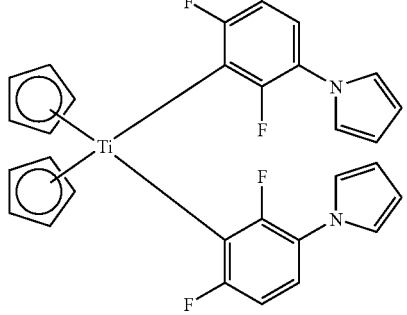
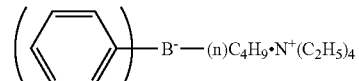
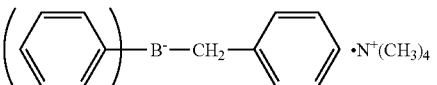
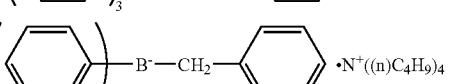
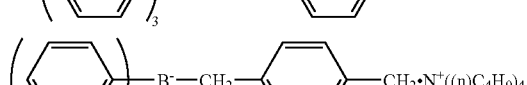
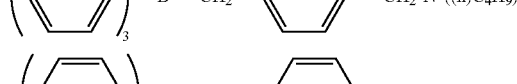
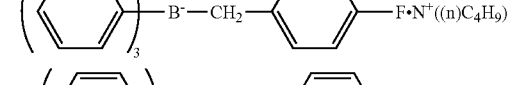
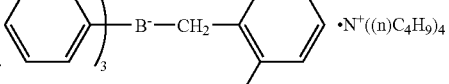
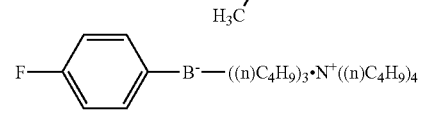

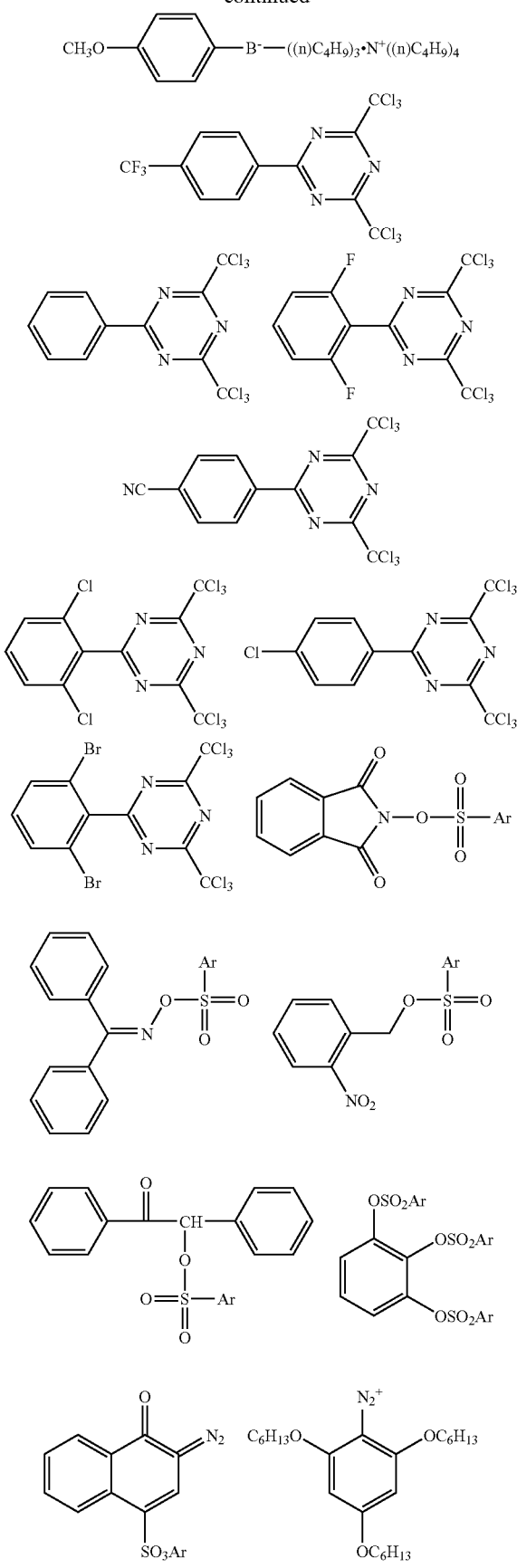
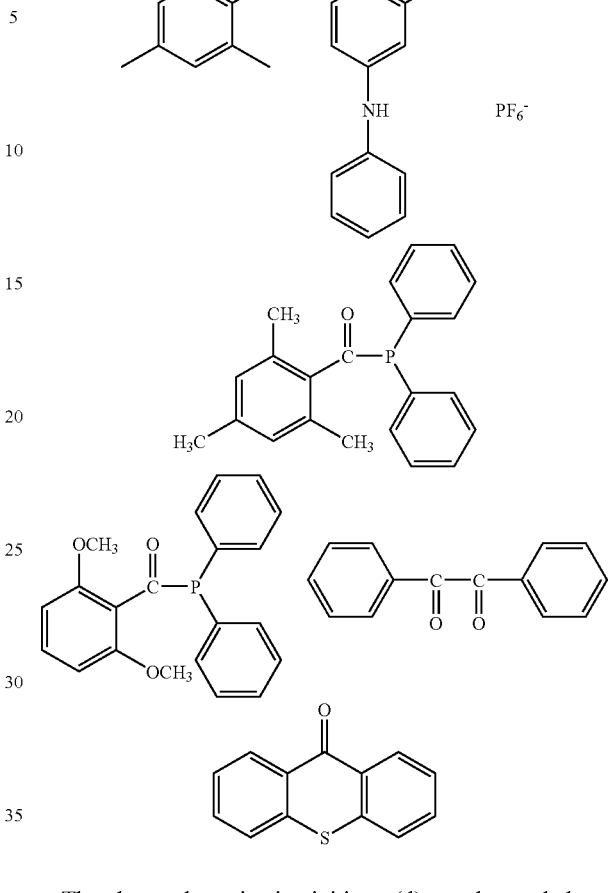

The photopolymerization initiator (d) may be used alone, or two or more kinds thereof may be used together.

The content of the photopolymerization initiator (d) is preferably in an amount of from 0.1% by mass to 20% by mass, more preferably from 0.5% by mass to 10% by mass, and still more preferably from 1% by mass to 7% by mass relative to the total mass of the ink composition of the invention.

<Other Components>

The ink composition of the invention may contain other components selected in accordance with the intended use, in addition to the specific polymer compound (a), the pigment (b), the polymerizable compound (c) and the polymerization initiator (d).

Examples of the other components include sensitizing dyes, co-sensitizers, resins, surfactants, ultraviolet absorbers, antioxidants, anti-fading agents, jetting stabilizers, adhesiveness improvers, leveling additives, matting agents and the like. These components may be used alone, or two or more kinds thereof may be used together.

—Sensitizing Dye—

When the ink composition of the invention contains the photopolymerization initiator (d), it is preferable that a sensitizing dye is contained in the polymerization initiator in order to increase in the sensitivity of the photopolymerization initiator.

The sensitizing dye has preferably a light absorption in the wavelength range of 350 nm to 450 nm.

Examples of the sensitizing dyes include, for example, polynuclear aromatic compounds (for example, pyrene, perylene and triphenylene), xanthenes (for example, fluorescein, eosine, erythrosine, Rhodamine B and Rose Bengal), cyanines (for example, thiacarbocyanine and oxacrarbocyanine), merocyanines (for example, merocyanine and carbomerocyanine), thiazins (for example, thionine, Methylene Blue and Toluidine Blue), acridines (for example, acridine orange, chloroflavin and acryflavin), anthraquinones (for example, anthraquinone), squariums (for example, squarium), coumalins (for example, 7-diethylamino-4-methyl-coumalin) and the like.

Preferable examples of the sensitizing dyes include the compounds represented by following formulae (IX) to (XIII):

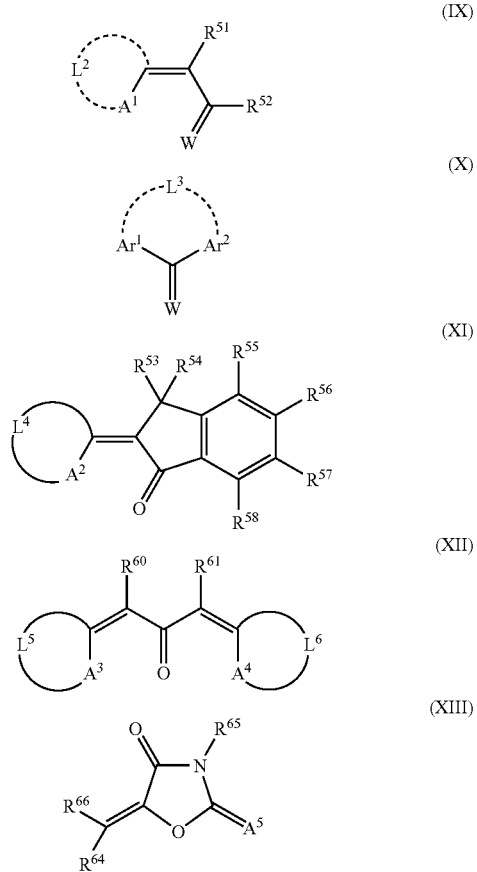

In formula (IX), $A^1$ represents a sulfur atom or $NR^{50}$. $R^{50}$ represents an alkyl group or an aryl group. $L^2$ represents a nonmetal atomic group which forms a basic nucleus of a dye together with the adjacent $A^1$ and the adjacent carbon atom. $R^{51}$ and $R^{52}$ each independently represent a hydrogen atom or a monovalent nonmetal atomic group, and these may be combined with each other to form an acid nucleus of the dye. W represents an oxygen atom or a sulfur atom.

In formula (X), $Ar^1$ and $Ar^2$ each independently represent an aryl group, and $Ar^1$ and $Ar^2$ are connected to each other via the linkage of -$L^3$-. $L^3$ represents —O— or —S—. W is synonymous with the group shown in formula (IX).

In formula (XI), $A^2$ represents a sulfur atom or $NR^{59}$, and $L^4$ represents a nonmetal atomic group which forms a basic nucleus of the dye together with the adjacent $A^2$ and the adjacent carbon atom. $R^{53}$, $R^{54}$, $R^{55}$, $R^{56}$, $R^{57}$ and $R^{58}$ each independently represent a monovalent nonmetal atomic group. $R^{59}$ represents an alkyl group or an aryl group.

In formula (XII), $A^3$ and $A^4$ each independently represent —S—, $NR^{62}$— or $NR^{63}$—. $R^{62}$ and $R^{63}$ each independently represent a substituted or unsubstituted alkyl group, or a substituted or unsubstituted aryl group. $L^5$ and $L^6$ each independently represent a nonmetal atomic group which forms a basic nucleus of the dye together with the adjacent $A^3$, $A^4$ and the adjacent carbon atom. $R^{60}$ and $R^{61}$ each independently represent a hydrogen atom or a monovalent nonmetal atomic group, or may be combined with each other to form an aliphatic or aromatic ring.

In formula (XIII), $R^{66}$ represents an aromatic ring which may have a substituent or a hetero ring which may have a substituent. $A^5$ represents an oxygen atom, a sulfur atom, or $NR^{67}$—. $R^{64}$, $R^{65}$ and $R^{67}$ each independently represent a hydrogen atom or a monovalent nonmetal atomic group. $R^{67}$ and $R^{64}$, and $R^{65}$ and $R^{67}$ may be combined with each other to form an aliphatic or aromatic ring, respectively.

Preferable examples of the compounds represented by the above formulae (IX) to (XIII), include the following compounds A-1 to A-24.

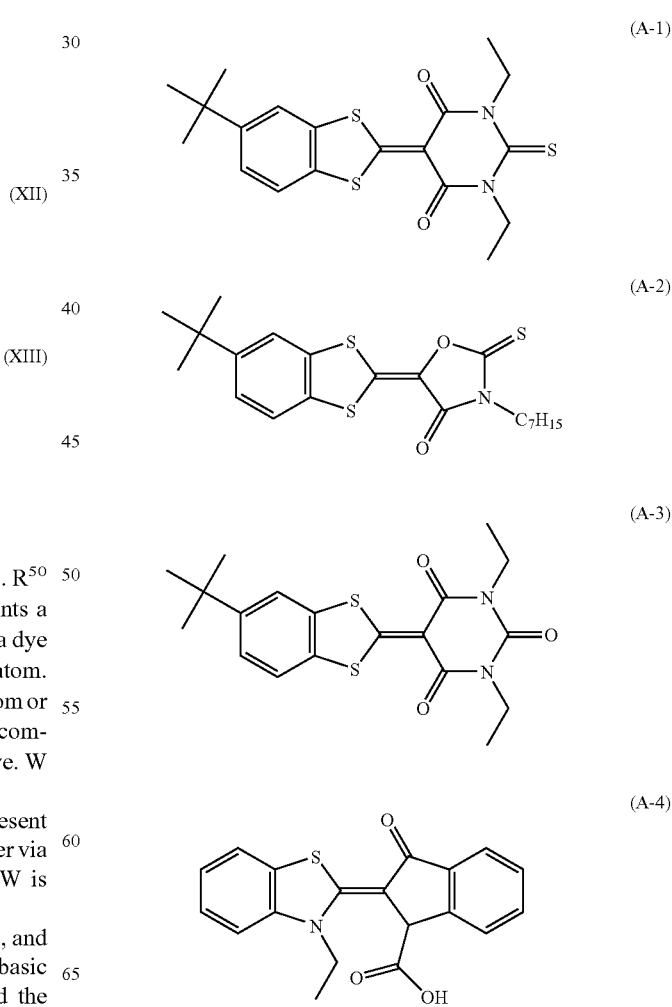

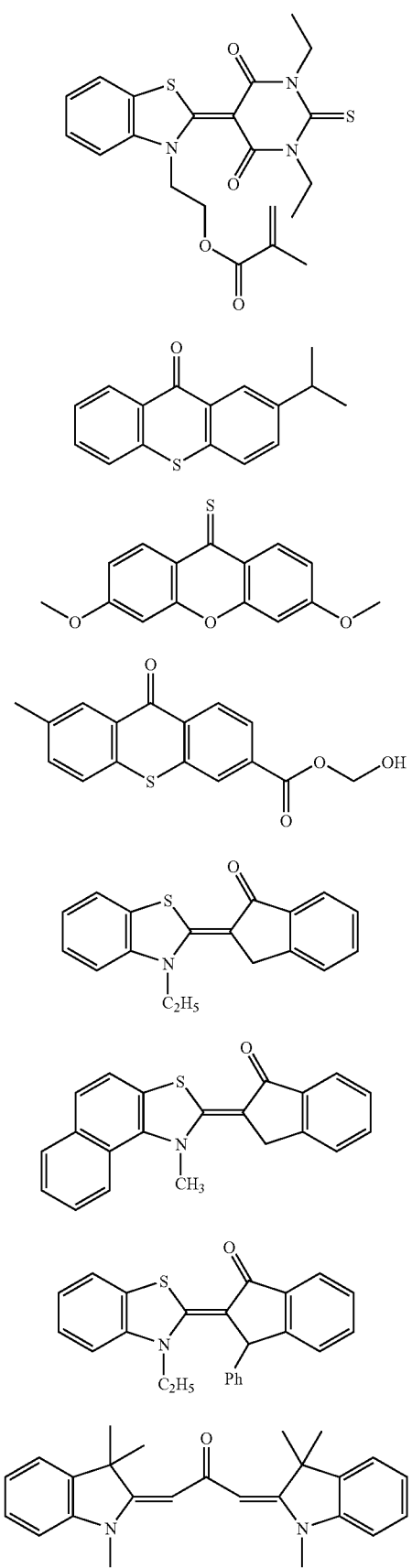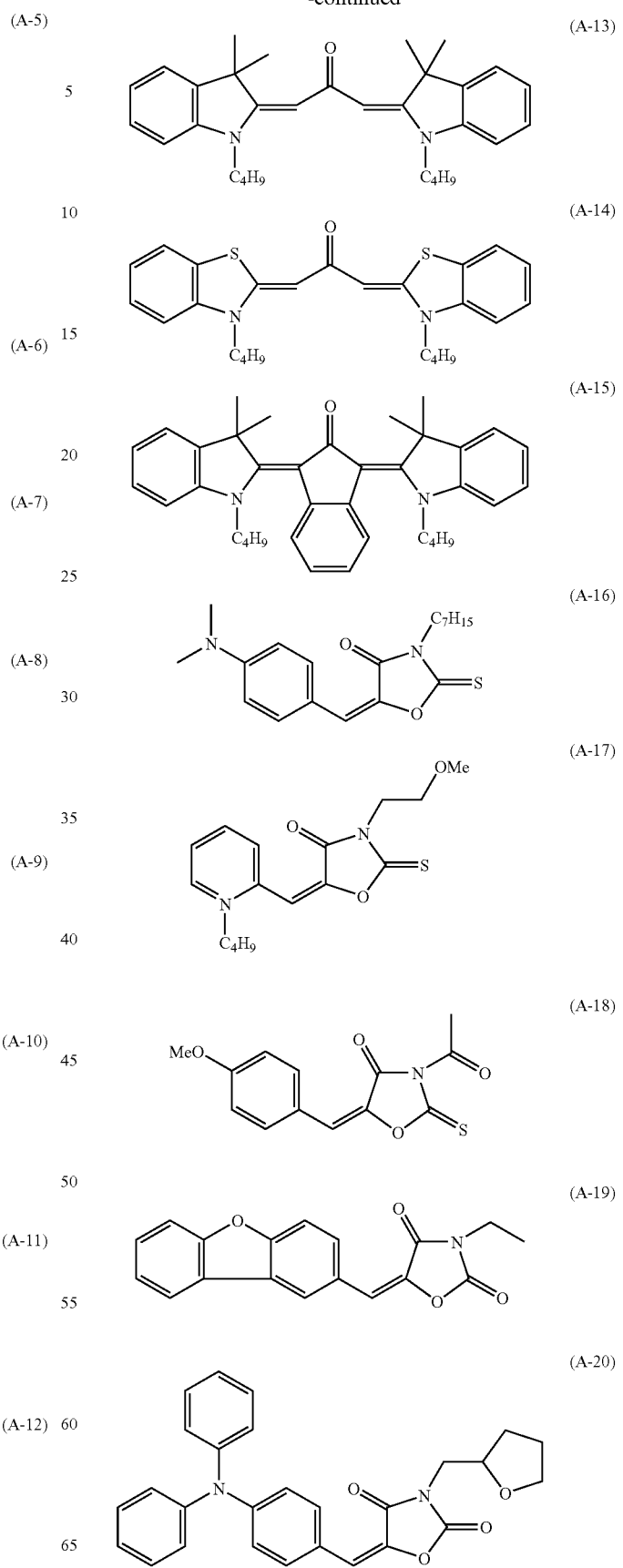

-continued

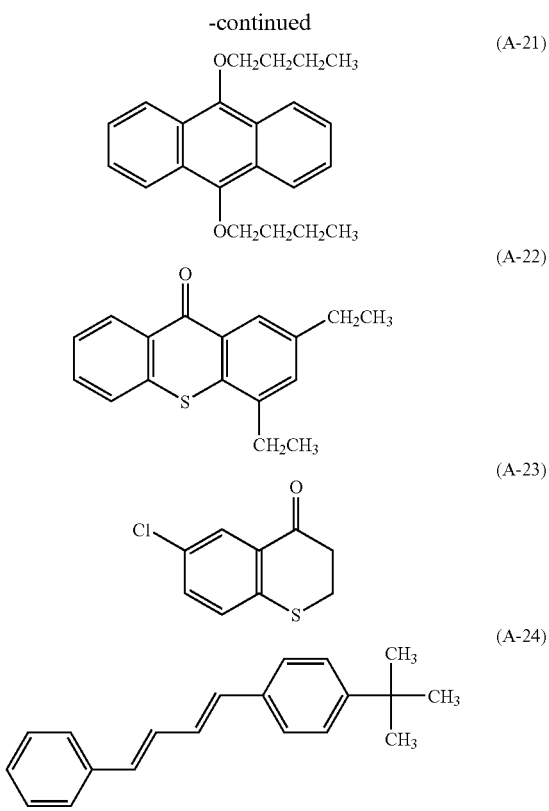

—Co-Sensitizer—

The ink composition of the invention may contain a co-sensitizer for the purpose of further increasing the sensitivity, or for the purpose of suppressing the polymerization inhibition due to oxygen.

Examples of co-sensitizers include amines (for example, compounds as recited in "Journal of Polymer Society", Volume 10, page 3173 (1972) written by M. R. Sander, et al., JP-B No. 44-20189, JP-A Nos. 51-82102, 52-134692, 59-138205, 60-84305, 62-18537 and 64-33104, and Research Disclosure No. 33825). As specific examples of the amines, triethanol amine, ethyl-p-dimethylaminobenzoate, p-formyl dimethyl aniline, p-methylthiodimethyl aniline and the like are suitably exemplified.

Further, as co-sensitizers, for example, thiols and sulfides (for example, thiol compounds recited in JP-A No. 53-702, JP-B No. 55-500806 and JP-A No. 5-142772, and disulfide compounds recited in JP-A No. 56-75643) are suitably exemplified.

Specific examples of thiols and sulfides include, for example, 2-mercapto benzothiazole, 2-mercapto benzoxazole, 2-mercapto benzoimidazole, 2-mercapto-4(3H)-quinazoline, β-mercapto naphthalene and the like.

Moreover, examples of the co-sensitizers include amino acid compounds (for example, N-phenyl glycine and the like), organic metal compounds as recited in JP-B No. 48-42965 (for example, tributyl tin acetate and the like), a hydrogen donor as recited in JP-B No. 55-34414, sulfur compounds as recited in JP-A No. 6-308727 (for example trithiane and the like), phosphorus compounds as recited in JP-A No. 6-250387 (for example, diethylphosphite and the like) and Si—H, Ge—H compounds as recited in JP-A No. 6-191605.

—Resin—

The ink composition of the invention may contain a resin which is different from the specific polymer compound (a), for the purpose of adjusting the physical properties of the layer of a recorded image.

Examples of the resins include, for example, an acrylic polymer, polyvinyl butyral resin, polyurethane resin, polyamide resin, polyester resin, epoxy resin, phenol resin, polycarbonate resin, polyvinyl butyral resin, polyvinyl formal resin, shellac, vinyl-based resin, acrylic resin, rubber-based resin, waxes and other natural resin. These may be used alone, or two or more kinds thereof may be used together. Moreover, in the invention, known waxes may be used in place of resins.

—Surfactant—

The ink composition of the invention may contain a surfactant for the purpose of adjusting the liquid physical properties of the ink composition.

The surfactants include, for example, a nonionic surfactant, a cationic surfactant, an anionic surfactant, a betaine surfactant, and further include an organic fluoro compound.

—Ultraviolet Absorber—

The ink composition of the invention contains preferably an ultraviolet absorber, from the viewpoint of improving weatherability and color-fading prevention of a recorded image, and contains preferably an antioxidant from the viewpoint of improving the stability of the ink composition. The ink composition contains preferably an anti-fading agent (for example, various kinds of organic-based and metal complex-based compounds) from the viewpoint of the prevention from color-fading of a recorded image, and contains an jetting stabilizer (for example, electroconductive salts such as potassium thiocyanate, lithium nitrate, ammonium thiocyanate and dimethylamine hydrochloride) from the viewpoint of the jetting stability in the case of the inkjet recording use, and further may contain an adhesion improving agent (for example, a very small amount of an organic solvent or a tackifier which does not inhibit polymerization) from the viewpoint of improving the adhesion with a recording medium. Furthermore, the ink composition may contain a leveling additive, matting agent and the like, if necessary.

—Solvent—

The ink composition of the invention may contain a solvent. However, when the ink composition of the invention is a curable ink, it is preferable that the ink composition does not contain a solvent or solvent-free, in order to cure the ink after the ink is applied to a recording medium. This is because the resistance to solvent may be deteriorated, or problem such as VOC (volatile organic compound) due to residual solvent may arise, when a solvent remains in a cured ink image.

For this reason, it is preferable that in the pigment dispersion contained in the ink composition of the invention, the polymerizable compound (c) is used as a dispersion medium in the curing reaction, and, in particular, a polymerizable compound with the lowest viscosity is selected from polymerizable compounds, which will be described later, in view of improving the dispersiblity and the handling characteristics of the ink composition.

<Physical Properties>

—Viscosity—

Although the viscosity of the ink composition of the invention is not specifically restricted, and may be selected in accordance with the intended use, the viscosity is preferably in the range of from 2 mPa·s to 30 mPa·s, and more preferably 20 mPa·s or less at the temperature when the ink composition is jetted, in consideration of the jetting stability.

Further, the viscosity the ink composition of the invention at room temperature (25° C.) is preferably 10 mPa·s to 200 mPa·s, and more preferably 100 mPa·s or less.

By setting the viscosity at room temperature (25° C.) higher, even when a porous recording medium is used, it is possible that the permeation of ink into the recording medium is prevented, the amount of uncured monomer is reduced, and odor is reduced, dot bleed can be suppressed at the time when ink droplets are spotted on the medium, and as a result, it is advantageous in that a high quality image can be obtained.

On the other hand, when the viscosity at room temperature (25° C.) exceeds 200 mPa·s, a problem in delivery of the ink composition may arise.

In addition, the viscosity can be measured, for example, using a cone plate type rotating viscometer (E-type viscometer).

—Surface Tension—

Although the surface tension of the ink composition of the invention is not specifically restricted, and may be selected in accordance with the intended use, the surface tension is, for example, preferably from 20 mN/m to 30 mN/m, and more preferably from 23 mN/m to 28 mN/m.

Moreover, when recording is made with the use of the ink composition of the invention, on a recording medium such as polyolefin, PET, coat paper, non-coated paper and the like, the surface tension is preferably 20 mN/m or more from the viewpoint of bleeding and permeability, and is preferably 30 mN/m or less from the viewpoint of wettability.

In addition, the surface tension can be measured, for example, with the use of a surface tension balance using Wilhelmy method, or a Du Nouy surface tension balance.

<Preparation of Ink Composition>

The method of preparing the ink composition of the invention is not specifically restricted, and may be selected in accordance with the intended use, and, for example, the ink composition can be prepared by mixing the above components. In addition, the mixing can be performed in accordance with known methods using known mixing apparatuses.

<Mode of Use>

The ink composition of the invention can be preferably used as an ink for various kinds of image recording, and when the ink composition is used as a curable ink, in particular, the ink composition is suitable for inkjet recording use.

In this case, the ink composition of the invention is printed onto a recording medium with an inkjet printer, and thereafter, the printed ink composition is irradiated with an actinic ray to be cured, whereby an image can be recorded.

When the ink composition of the invention is used for an inkjet printing system, a high quality image can be directly printed even on a liquid non-absorptive recording medium based on digital data, so that the ink composition of the invention can also be suitably used for preparing large sized printed matter.

Moreover, since the image area in the printed matter obtained using the ink composition of the invention is cured by being irradiated with an actinic ray such as an ultraviolet ray, the printed matter is excellent in strength. Accordingly, for example, in addition to image recording (image formation), the ink composition can be used preferably in various uses such as formation of an ink receiving layer (image area) of a planographic printing plate.

For example, when the ink composition of the invention is used for ordinary printing, since a sharp image with excellent color-forming property can be obtained, not only can high quality printed matter be obtained, but the ink composition can be suitably used for the production of a resist, color filter or optical disk, and further is useful as an optical molding material.

—Inkjet Recording—

The inkjet recording using the ink composition of the invention will be explained.

The method and conditions of the inkjet recording are not specifically restricted, and may be selected in accordance with the intended use, and for example, it is preferable from the viewpoint of excellent ink jetting characteristics, that the ink composition of the invention is jetted from an inkjet nozzle head after the ink composition is heated at a temperature of from 40° C. to 80° C. and the viscosity of the ink composition is adjusted to 30 mPa·s or less.

In general, in such a radiant ray-curable ink composition as the ink composition of the invention, since the viscosity is generally higher than that of a common aqueous ink, the fluctuation range of the viscosity due to variation in temperature at the time of image recording (at the time of printing) is larger than that of the aqueous ink. Since the fluctuation of the viscosity greatly influences the liquid droplet size and the liquid droplet jetting rate directly, the fluctuation causes deterioration of image quality. For this reason, it is necessary to keep the temperature of the ink composition at the time of image recording (at the time of printing) as constant as possible. The temperature of the ink composition is preferably controlled to within the range of ±5° C. relative to a preset temperature, more preferably ±2° C. relative to a preset temperature, and particularly preferably ±1° C. relative to a preset temperature.

Although the inkjet recording apparatus for use in the inkjet recording is not specifically restricted, and may be appropriately selected from known apparatuses, and commercially available apparatuses may be used, it is preferable that an apparatus is equipped with a stabilizing unit for the temperature of the ink composition. In this case, the section where the temperature of the ink composition is maintained constant is preferably all the members including the piping system from an ink tank (from an intermediate tank in the case that the intermediate tank is present) to an ink ejection surface of the nozzle.

The method of controlling the temperature of the ink composition is not specifically restricted, and for example, it is preferable that the temperature is controlled with heating in accordance with the flow rate of the ink composition and the ambient temperature by detecting the temperatures with plural temperature sensors provided in each pipe section. Further, it is preferable that the ink nozzle head which jets the ink composition is heated. In this case, it is preferable that the main body of the inkjet recording apparatus is thermally shielded or insulated so as not to be influenced by a temperature of the outside air. In order to shorten the start-up time of the inkjet recording apparatus (printer) required for heating, or to reduce heat energy loss, it is preferable that the heated section is thermally insulated from the other sections, and that the heat capacity of the unit to be heated as a whole is reduced.

—Jetting Conditions of Ink Composition—

When the ink composition of the invention is used for inkjet recording, it is preferable that the ink composition of the invention is heated to a constant temperature, and also that the time from the jetting of the ink composition to the irradiation with an actinic ray is short.

The time from the jetting of the ink composition to the irradiation with the actinic ray (hereinafter sometimes referred to as a "time before irradiation") is preferably, for example, from 0.01 to 0.5 seconds, more preferably from 0.01 to 0.3 seconds, and particularly preferably from 0.01 to 0.15 seconds.

It is advantageous that the time before irradiation is controlled to within the above ranges, in view of the fact that bleeding of the jetted ink composition before being cured can be effectively prevented, and when a porous recording medium is used, the ink composition can be irradiated with the actinic ray before the ink composition penetrates to a deep part of the recording medium where the light source cannot reach, so that remaining unreacted monomer can be suppressed, and as a result, odor can be reduced.

It is advantageous that the ink composition of the invention is jetted under the above jetting conditions, in view of the fact that the dot diameter of the jetted ink composition in a droplet form can be maintained constant, even on various recording media having different wettabilities, whereby a high quality image can be obtained.

In addition, in order to obtain a color image, it is preferable that an ink which has a color having a lower luminosity is overlaid with an ink which has a color having a higher luminosity in sequence. When an ink which has a color having a lower luminosity is laid on top of another, the actinic ray cannot reach the deep part of the ink, whereby problems such that the sensitivity to curing may be suppressed, remaining monomer is increased, odor is generated, and adhesion is deteriorated may easily arise. Moreover, although the irradiation with the actinic ray may be performed at once after all the inks have been jetted, it is preferable that the irradiation with the actinic ray is performed each time after each ink is jetted, from the viewpoint of facilitating the curing of the ink.

As described above, even though the ink composition of the invention is subjected to an increase in temperature and an decrease in temperature repeatedly, by virtue of the action or function of the specific polymer compound (a), even when the ink composition is stored in such a condition, it is advantageous in that decrease in the dispersibility of the pigment can be effectively suppressed, excellent color-forming characteristics can be maintained over a long period of time, and further, decrease in jetting stability due to agglomeration of pigment particles can be effectively suppressed.

—Curing—

After an image is recoded, the ink composition of the invention is cured by being irradiated with an actinic ray, and the conditions of irradiation with the actinic ray are not specifically restricted, and can be selected in accordance with the intended purpose.

For example, a method of irradiating with an actinic ray is recited in JP-A No. 60-132767, and more specifically, light sources are provided at the both side of a head unit, and scanning is performed with the use of the head and light sources in a shuttle-manner. The irradiation with the actinic ray is performed at a certain period of time after the ink droplets are spotted on a recording medium. Furthermore, the curing is completed by being irradiated with another light source which is not movable. Moreover, in the pamphlet of International Publication No. 99/54415, as a method of irradiating with an actinic ray, a method of using optical fibers, and a method in which a recording portion is irradiated with an ultraviolet ray by reflecting a collimated light from a light source on a mirror surface provided at the side of the head unit, are disclosed. These irradiation methods can be adopted for the present invention.

The amount of irradiation with the actinic ray may be of from 10 mJ/cm$^2$ to 10,000 mJ/cm$^2$, in the case of the ultraviolet ray. The photo curability is good in this irradiation range.

—Recording Medium—

The recording medium, on which the droplets of the ink composition of the invention are spotted to record an image, is not specifically restricted, and may be selected in accordance with the intended use. Examples of the recording media include paper such as regular non-coat paper and coat paper, and various kinds of liquid non-absorptive materials used for a so-called soft-packaging, or the resin film formed from liquid non-absorptive materials in a film shape. Further, examples of the resin film include a PET film, OPS film, OPP film, ONy film, PVC film, PE film, TAC film, polycarbonate film, acrylic film, ABS film, polyacetal film, PVA film, rubber film and the like. Moreover, metals and glasses may be used as the recording medium.

Hereinafter, exemplary embodiments of the invention are shown below:

<1> A pigment dispersion comprising a polymer compound having a partial structure represented by the following formula (1) at a terminal end of a main chain of the polymer compound, and a pigment:

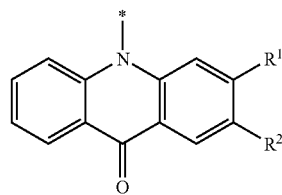

Formula (1)

In formula (1), R$^1$ and R$^2$ each independently represent a hydrogen atom or a monovalent substituent; R$^1$ and R$^2$ may form a ring by bonding with each other; and * represents a position that is directly or indirectly bonded to the main chain structure of the polymer compound.

<2> The pigment dispersion according to <1>, wherein the polymer compound having a partial structure represented by formula (1) at the terminal end of the main chain structure of the polymer compound is a polymer compound having a partial structure represented by the following formula (2) at the terminal end of the main chain structure of the polymer compound:

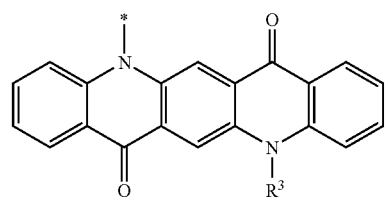

Formula (2)

In formula (2), R$^3$ represents a hydrogen atom, an alkyl group, an acyl group, or a carbamoyl group; and * represents a position that is directly or indirectly bonded to the main chain structure of the polymer compound.

<3> The pigment dispersion according to <1> or <2>, wherein the weight average molecular weight of the polymer compound having a partial structure represented by formula (1) or formula (2) is in the range of from 1,000 to 300,000, and the content of the polymer compound is from 2 parts by mass to 100 parts by mass relative to 100 parts by mass of the pigment.

<4> An ink composition comprising the pigment dispersion according to any of <1> to <3>.

<5> The ink composition according to <4>, further comprising (c) a polymerizable compound.

<6> The ink composition according to <5>, further comprising (d) a polymerization initiator.

EXAMPLES

Hereinafter, exemplary embodiments of the present invention will be described with reference to Examples, but the invention is not limited to these examples.

<Synthesis of Specific Polymer Compound>

—Synthesis of Specific Polymer Compound 1 (M-1 Shown in the Above Exemplary Embodiment)—

LiH (3.6 g) (0.45 mol) was added to 500 ml of anhydrous DMSO, and to the mixture was added 72.2 g (0.37 mol) of 9(10 H)-acridanone at room temperature. After the reaction solution was stirred for 30 minutes, 370 ml of ethylene oxide (1 M-THF solution) was added dropwise over 1 hour, and the solution was stirred at room temperature for 12 hours. 1M HCl aqueous solution (200 ml) was added thereto, and the mixture was extracted with 200 ml of chloroform three times, and the collected organic phase was washed with 100 ml of aqueous saturated sodium hydrogen-carbonate solution once, and washed with saturated brine twice. The resultant product was dried with anhydrous magnesium sulfate, and thereafter, an organic solvent was removed under reduced pressure to obtain 54.0 g (0.23 mol) of a crude product of 9(N-ethanol) acridanone in a 62% yield.

The obtained crude composition of 54.0 g (0.23 mol) of 9(N-ethanol) acridanone and 100 ml of pyridine were mixed, and the mixture was cooled to 0° C., and 57.2 g (0.30 mol) of p-toluenesulfonyl chloride was gradually added thereto, and the temperature of the mixture was raised to room temperature. After the reaction mixture was stirred at room temperature for 5 hours, the solid crude product obtained by adding 400 ml of water slowly to the reaction mixture was recrystallized from ethanol/toluene, and 55.1 g (0.14 mol) of 9(N-ethyl-p-toluenesulfonyl ester)acridanone was obtained in a 61% yield.

The thus obtained 9(N-ethyl p-toluenesulfonyl ester)acridanone (55.1 g (0.14 mol)) was mixed with 120 ml of ethanol and 21.3 g (0.28 mol) of thiourea was added thereto, and the resultant mixture was refluxed with stirring and heating for 4 hours. An aqueous saturated sodium hydrogen-carbonate solution (100 ml) was added to the reaction mixture, and further the resultant mixture was refluxed with stirring and heating for 3 hours. After cooling the reaction mixture to room temperature, 100 ml of chloroform was added thereto, the organic phase was separated, and further, an organic substance was extracted with chloroform twice. The obtained organic phase was dried with anhydrous magnesium sulfate, and the solvent was distilled away under reduced pressure, and 30.6 g (0.12 mol) of a crude product of 9(N-ethylthiol) acridanone was obtained in a 86% yield.

A mixed solution of 1.53 g (0.00 6 mol) of 9(N-ethylthiol) acridanone, 180.0 g (1.8 mol) of methyl methacrylate (MMA; monomer) and 150.0 g of dimethyl formamide was heated to 80° C. in a steam of nitrogen gas. After 0.77 g of 2,2'-azobis (isobutylonitrile) [AIBN manufactured by Wako Pure Chemical Industries, Ltd.] was added to the mixture and heated for 3 hours, 0.77 g of AIBN was added again, and the mixture was reacted at 80° C. for 3 hours in a steam of nitrogen gas. The reaction solution was cooled to room temperature, and was diluted with acetone. A precipitate obtained by being subjected to reprecipitation with use of a large amount of methanol was vacuum-dried, and 170.0 g (Mw=30,000)) of the solid of the specific polymer compound 1 of the invention as shown below was obtained. In the following specific polymer compound 1, n represents an integer of 300.

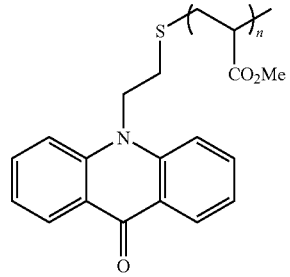

Specific Polymer Compound 1

—Synthesis of Specific Polymer Compound 2 (M-11 Shown in the Exemplary Embodiment)—

NaH (18.0 g (0.45 mol) in 60% in mineral oil) was added to 500 ml of anhydrous DMSO and 115.6 g (0.37 mol) of quinacridone was added to the mixture at room temperature. After the mixture was stirred for 30 minutes, 52.5 g (0.37 mol) of methyl iodide was added dropwise to the mixture over 1 hour, and the resultant solution was stirred for 3 hours at room temperature, and thereafter, was raised to a temperature of 60° C. and stirred for 2 hours. A crude solid product obtained by adding 500 ml of water thereto slowly was washed with water/methanol, 86.9 g (0.27 mol) of (N-methyl)quinacridone was obtained in a 72% yield.

LiH (2.6 g (0.33 mol)) was added to 350 ml of anhydrous DMSO, and to the mixture was added the thus obtained 86.9 g (0.2 7 mol) of (N-methyl)quinacridone at room temperature. After stirring for 30 minutes, 370 ml of ethylene oxide (1 M THF solution) was added dropwise thereto over 1 hour, and stirred at room temperature for 12 hours. HCl (1M) aqueous solution (200 ml) was added thereto, and the mixture was extracted with 200 ml of chloroform three times, and the collected organic phase was washed with 100 ml of saturated sodium hydrogen-carbonate aqueous solution once, and washed with saturated brine twice. The resultant product was dried with anhydrous magnesium sulfate, thereafter, an organic solvent was removed under reduced pressure and 61.9 g (0.17 mol) of a crude product of (N-ethylol-N'-methyl) quinacridone was obtained in a 63% yield.

The obtained crude composition (61.9 g (0.17 mol)) of (N-ethylol-N'-methyl)quinacridone and 100 ml of pyridine were mixed, and the mixture was cooled to 0° C., and 41.9 g (0.22 mol) of p-toluenesulfonyl chloride was gradually added to the mixture, and the temperature thereof was raised to room temperature. After the reaction mixture was stirred at room temperature for 5 hours, 400 ml of water was slowly added to the reaction mixture, and the thus obtained solid crude product was recrystallized from ethanol/toluene, and 57.7 g (0.11 mol) of (N-ethyl-p-toluenesulfonyl ester-N'-methyl)quinacridone was obtained in a 65% yield.

The obtained (N-ethyl-p-toluenesulfonyl ester-N'-methyl) quinacridone (57.7 g (0.11 mol)) was mixed with 120 ml of ethanol, and 16.7 g (0.22 mol) of thiourea was added thereto, and the mixture was refluxed with heating and stirring for 4 hours. An aqueous saturated sodium hydrogen-carbonate solution (100 ml) was added to the reaction mixture, and further the resultant mixture was refluxed with stirring and heating for 3 hours. After cooling the reaction mixture to room temperature, 100 ml of chloroform was added thereto, the organic phase was separated, and further, the organic phase was extracted with chloroform twice. The obtained organic phase was dried with anhydrous magnesium sulfate, and a solvent was distilled away under reduced pressure, and 34.8 g (0.09 mol) of (N-ethylthiol-N'-methyl)quinacridone was obtained.

A mixed solution of 2.32 g (0.006 mol) of (N-ethylthiol, N'-methyl)quinacridone, 192.0 g (1.9 mol) of methyl methacrylate (MMA; monomer) and 150.0 g of dimethyl formamide was heated to 80° C. in a steam of nitrogen gas. After 0.77 g of 2,2'-azobis(isobutylonitrile [AIBN manufactured by Wako Pure Chemical Industries, Ltd.] was added to the mixture and heated for 3 hours, 0.77 g of AIBN was added thereto again, and the mixture was reacted at 80° C. for 3 hours in a steam of nitrogen gas. The reaction solution was cooled to room temperature, and was diluted with acetone. A precipitate obtained by being subjected to reprecipitation with use of a large amount of methanol was vacuum-dried, and a solid of the specific polymer compound 2 (180.0 g (Mw=32,000)) of the invention as shown below was obtained. In the following specific polymer compound 2, n represents an integer of 320.

Specific Polymer Compound 2

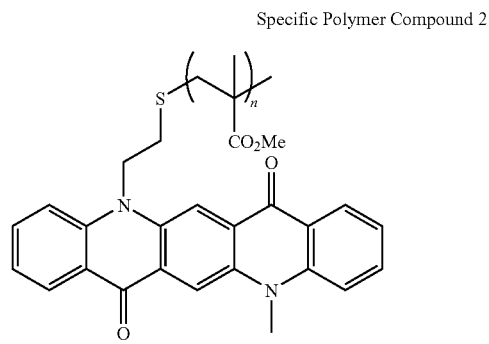

—Synthesis of Specific Polymer Compound 3—

A mixed solution of 1.53 g (0.00 6 mol) of 9(N-ethylthiol)acridanone, 180.0 g (1.8 mol) of methyl methacrylate (MMA; monomer), 144.0 g of AA-6 ((trade name) (macromomoner) manufactured by Toagosei Co., Ltd.) and 200.0 g of dimethyl formamide was heated to 80° C. in a steam of nitrogen gas. After 0.77 g of 2,2'-azobis(isobutylonitrile [AIBN manufactured by Wako Pure Chemical Industries, Ltd.] was added to the mixture and heated for 3 hours, 0.77 g of AIBN was added thereto again, and the mixture was reacted at 80° C. for 3 hours at a steam of nitrogen gas. The reaction solution was cooled to room temperature, and was diluted with acetone. A precipitate obtained by being subjected to reprecipitation with use of a large amount of methanol was vacuum-dried, and 311.0 g (Mw=50,000 of a solid of the specific polymer compound 3 of the invention as shown below was obtained. In the following specific polymer compound 3, n represents an integer of 300, and n' represents an integer of 4.

Specific Polymer Compound 3

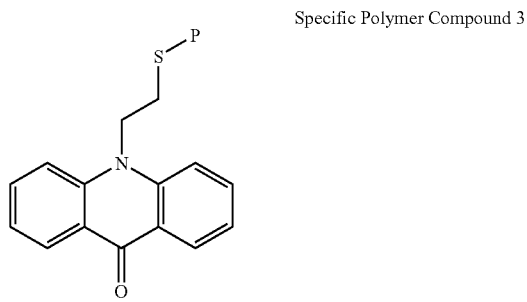

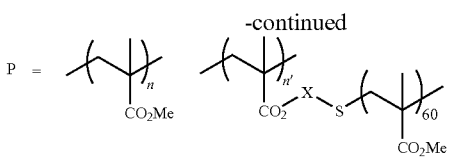

—Synthesis of Specific Polymer Compound 4—

A mixed solution of 0.80 g (0.003 mol) of 9(N-ethylthiol)acridanone, 20.0 g (0.200 mol) of methyl methacrylate (MMA; monomer), and 30.0 g of dimethyl formamide was heated to 80° C. in a steam of nitrogen gas. After 0.003 g of 2,2'-azobis(isobutylonitrile [AIBN manufactured by Wako Pure Chemical Industries, Ltd.] was added to the mixture and heated for 3 hours, and an operation, in which 0.003 g of AIBN was added thereto again and the mixture was reacted at 80° C. for 3 hours in a steam of nitrogen gas, was repeated twice (the addition of the initiator was three times in total). The reaction solution was cooled to room temperature, and was diluted with acetone. A precipitate obtained by being subjected to reprecipitation with use of a large amount of methanol was vacuum-dried, 19.0 g (Mw=78,000) of a solid of the specific polymer compound 4 of the invention was obtained.

Each of the specific polymer compounds synthesized in the Examples contains one site that is interactive with a pigment and steric repulsive sites (polymer chain). It is assumed that the steric repulsive sites (polymer chain) have a higher affinity for a dispersion medium than the affinity for a pigment, and serve as steric repulsive groups for sterically preventing the aggregation of pigment particles in a dispersion. It can be assumed that since the specific polymer compound has one site which is interactive with a pigment, a larger number of molecules of the specific polymer can be adsorbed compared to the number of pigment particles, and the dispersion stability of the ink can be maintained.

—Preparation of Pigment Dispersion—

Example 1

The synthesized specific polymer compound 1 (6.0 g) dissolved in 64 g of propoxylated neopentylglycol diacrylate (NPGPODA manufactured by Sartomer Company Inc.) as a polymerizable compound is dispersed together with 30 g of a quinacridone pigment (PR122) in a motor mill M50 ((trade name) manufactured by Iger Corporation) using zirconia beads having a diameter of 0.65 mm at a peripheral speed of 9 m/s for 2 hours, and a pigment dispersion 1-1 was obtained.

Example 2

A pigment dispersion 1-2 in Example 2 was obtained in a manner similar to Example 1, except that the specific polymer compound 1 in Example 1 was changed to the specific polymer compound 2.

Example 3

A pigment dispersion 1-3 in Example 3 was obtained in a manner similar to Example 1, except that the specific polymer compound 1 in Example 1 was changed to the specific polymer compound 3.

Example 4

A pigment dispersion 1-4 in Example 4 was obtained in a manner similar to Example 1, except that the specific polymer compound 1 in Example 1 was changed to the specific polymer compound 4.

Comparative Example 1

A pigment dispersion 2-1 of Comparative Example 1 was obtained in a manner similar to Example 1, except that the specific polymer compound 1 in Example 1 was changed to Dispersant A (SOLSPERSE 24000GR (trade name) manufactured by Lubrizol Japan, Ltd.).

Comparative Example 2

A pigment dispersion 2-2 of Comparative Example 2 was obtained in a manner similar to Example 1, except that the specific polymer compound 1 in Example 1 was changed to Dispersant B (SOLSPERSE 32000 (trade name) manufactured by Lubrizol Japan, Ltd.).

Examples 5, 6, 7 and 8, and Comparative Examples 3 and 4

A pigment dispersion 1-5 in Example 5, a pigment dispersion 1-6 in Example 6, a pigment dispersion 1-7 in Example 7 and a pigment dispersion 1-8 of Example 8, and a pigment dispersion 2-3 of Comparative Examples 3 and a pigment dispersion 2-4 of Comparative Examples 4 were prepared by manners similar to Examples 1, 2, 3 and 4, and Comparative Examples 1 and 2, respectively, except that the "quinqcridone pigment (PR122)" used in Examples 1, 2, 3 and 4, and Comparative Examples 1 and 2 was changed to a "condensed azo pigment (PY128)", respectively.

Examples 9, 10, 11 and 12, and Comparative Examples 5 and 6

A pigment dispersion 1-9 in Example 9, a pigment dispersion 1-10 in Example 10, a pigment dispersion 1-11 in Example 11 and a pigment dispersion 1-12 in Example 12, and a pigment dispersion 2-5 of Comparative Examples 5 and a pigment dispersion 2-6 of Comparative Examples 6 were prepared in manners similar to Examples 1, 2, 3 and 4, and Comparative Examples 1 and 2, respectively, except that 64.0 g of NPGPODA as a polymerizable compound was changed to 64.0 g of the oxetane compound (OXT-221 (trade name) manufactured by Toagosei Ltd.) as a polymerizable compound, respectively.

Examples 13, 14, 15 and 16, and Comparative Examples 7 and 8

A pigment dispersion 1-13 in Example 13, a pigment dispersion 1-14 in Example 14, a pigment dispersion 1-15 in Example 15 and a pigment dispersion 1-16 in Example 16, and a pigment dispersion 2-7 of Comparative Examples 7 and a pigment dispersion 2-8 of Comparative Examples 8 were prepared in manners similar to Examples 9, 10, 11 and 12, and Comparative Examples 5 and 6, respectively, except that the "quinacridone pigment (PR122)" was changed to "phthalocyanine pigment (PB 15:3), respectively.

—Preparation of Ink Composition for Inkjet—

Example 17

The following polymerizable compound and the following polymerizable initiator were added to the pigment dispersion 1-1 obtained in Example 1, were mixed gently, and the mixture was filtered with pressure with the use of a membrane filter to obtain an ink composition 1-1' for a curable ink composition for inkjet. The quantities of the pigment dispersion 1-1, the polymerizable compound, and the polymerization initiator are shown below.

| | |
|---|---|
| Pigment Dispersion 1-1 | 17 g |
| polymerizable compound: | |
| (1) propoxylated neopentylglycol diacrylate (NPGPODA: manufactured by Sartomer Company Inc.) | 19.1 g |
| (2) dipropyleneglycol diacrylate (DPGDA: manufactured by Daicel Cytec Company Ltd.) | 30.0 g |
| (3) phenoxy ethylacrylate (AMP-10G: manufactured by Shin-Nakamura Chemical Co., Ltd.) | 28.9 g |
| polymerization initiator: (acyl phosphineoxide compound (LucirinTPO-L manufactured by BASF Japan Ltd.) | 5.0 g |

Example 18

A curable ink composition 1-2' for inkjet in Example 18 was obtained in a manner similar to Example 17, except that the pigment dispersion 1-1 in Example 17 was changed to the pigment dispersion 1-2.

Example 19

A curable ink composition 1-3' for inkjet in Example 19 was obtained in a manner similar to Example 17, except that the pigment dispersion 1-1 in Example 17 was changed to the pigment dispersion 1-3.

Example 20

A curable ink composition 1-4' for inkjet in Example 20 was obtained in a manner similar to Example 17, except that the pigment dispersion 1-1 in Example 17 was changed to the pigment dispersion 1-4.

Comparative Example 9

A curable ink composition 2-1' for inkjet of Comparative Example 9 was obtained in a manner similar to Example 17, except that the pigment dispersion 1-1 in Example 17 was changed to the pigment dispersion 2-1.

Comparative Example 10

A curable ink composition 2-2' for inkjet of Comparative Example 10 was obtained in a manner similar to Example 17, except that the pigment dispersion 1-1 in Example 17 was changed to the pigment dispersion 2-2.

Examples 21, 22, 23 and 24, and Comparative Examples 11 and 12

A curable ink composition for inkjet 1-5' in Example 21, a curable ink composition for inkjet 1-6' in Example 22, a curable ink composition for inkjet 1-7' in Example 23 and a curable ink composition for inkjet 1-8' in Example 24, and a curable ink composition for inkjet 2-3' in Comparative Example 11 and a curable ink composition for inkjet 2-4' in Comparative Example 12 were prepared in manners similar to Examples 17, 18, 19 and 20, and Comparative Examples 9 and 10, except that the pigments used in Examples 17, 18, 19 and 20, and Comparative Examples 9 and 10 were changed to the pigment dispersions 1-5, 1-6, 1-7, 1-8, 2-3 and 2-4, respectively. Namely, the "quinacridone pigment (PR122)" used in Examples 17, 18, 19 and 20, and Comparative Examples 9 and 10 was changed to the "condensed azo pigment (PY128)".

Example 25

The following polymerizable compound and the following polymerizable initiator were added to the pigment dispersion 1-9 obtained in Example 9, were mixed gently, and the mixture was filtered with pressure with the use of a membrane filter to obtain an ink composition 1-9' for curable ink composition for inkjet. The quantities of the pigment dispersion 1-9, the polymerizable compound, and the polymerization initiator are shown below.

| | |
|---|---|
| Pigment Dispersion 1-9 | 17 g |
| polymerizable compound: | |
| (A) oxetane compound (OXT-221; manufactured by Toagosei Ltd.) | 59.1 g |
| (B) epoxy compound (CELLOXIDE 3000: manufactured by Daicel Chemical Industries Ltd.) | 18.9 g |
| polymerization initiator: triphenylsulfonium salt; (UVI-6992) manufactured by Dow Chemical Company) | 5.0 g |

Examples 26, 27 and 28, and Comparative Examples 13 and 14

A curable ink composition for inkjet 1-10' in Example 26, a curable ink composition for inkjet 1-11' in Example 27, and a curable ink composition for inkjet 1-12' in Example 28, and a curable ink composition for inkjet 2-5' in Comparative Example 13 and a curable ink composition for inkjet 2-6' in Comparative Example 14 were prepared in manners similar to Example 25, except that the pigment dispersion 1-9 used in Example 25 was changed to the pigment dispersions 1-10, 1-11, 1-12, 2-5 and 2-6, respectively.

Examples 29, 30, 31 and 32, and Comparative Examples 15 and 16

A curable ink composition for inkjet 1-13' in Example 29, a curable ink composition for inkjet 1-14' in Example 30, a curable ink composition for inkjet 1-15' in Example 31 and a curable ink composition for inkjet 1-16' in Example 32, and a curable ink composition for inkjet 2-7' in Comparative Example 15 and a curable ink composition for inkjet 2-8' in Comparative Example 16 were prepared in manners similar to Examples 25, 26, 27 and 28, and Comparative Examples 13 and 14, except that the pigment dispersions used in Examples 25, 26, 27 and 28, and Comparative Examples 13 and 14 were changed to the pigment dispersions 1-13, 1-14, 1-15 and 1-16, 2-7 and 2-8, respectively. Namely, the "quinacridone pigment (PR122)" used in Examples 25, 26, 27 and 28, and Comparative Examples 13 and 14 were changed to the "phthalocyanine pigment (PB15:3)".

—Evaluation of Pigment Dispersion and Ink Composition—

The obtained pigment dispersions and ink compositions (curable ink composition for inkjet) were evaluated in accordance with the following methods. The results on the pigment dispersions are shown in Tables 1A and 1B, and the results on the ink compositions are shown in Tables 2A and 2B.

<Viscosity of Pigment Dispersion>

The viscosity of the pigment dispersions at 40° C. was measured using an E type viscometer. The viscosity was evaluated in accordance with the following criteria:

A: lower than 500 mPa·s; and

B: 500 mPa·s or higher and lower than 1,000 mPa·s.

<Average Particle Diameter>

The volume average particle diameter D50 of the pigment dispersions was measured using a light scattering particle size distribution analyzer (LA910 (trade name) manufactured by Horiba, Ltd.), and was evaluated in accordance with the following criteria:

A: D50 is less than 200 nm;

B: D50 is 200 nm or more and less than 300 nm; and

C: D50 is 300 nm or more.

<Viscosity of Ink Composition>

The viscosity of the ink compositions at 40° C. was measured using an E type viscometer. The viscosity was evaluated in accordance with the following criteria:

A: lower than 30 mPa·s;

B: 30 mPa·s or higher and lower than 70 mPa·s; and

C: 70 mPa·s or higher.

<Dispersion Stability>

The dispersed state of the ink compositions was evaluated based on visual inspection and change in viscosity after the ink compositions were stored at 25° C. for one month and at 70° C. for 24 hours, in accordance with the following criteria:

A: precipitates are not observed and increase in viscosity is not observed;

B: precipitates are not observed and the viscosity is slightly increased, but the increase in viscosity is not problematic in the ink jetting property;

C: precipitates are not observed, but the viscosity is increased, and the increase in viscosity is practically problematic in the ink jetting property; and D: precipitates are observed, and the ink jetting property is problematic.

<Average Particle Diameter>

The volume average particle diameter D50 of each ink composition was measured using a light scattering particle size distribution analyzer (LA910 (trade name) manufactured by Horiba, Ltd.), and was evaluated in accordance with the following criteria:

A: D50 is less than 200 nm;

B: D50 is from 200 nm to less than 300 nm;

C: D50 is 300 nm or more.

<Curability>

Image recording (printing) using each ink composition was performed on art paper with the use of an inkjet printer (print density of 300 dpi; droplet jetting frequency; 4 kHz; number of nozzles; 64): and thereafter the recorded image was irradiated with an ultraviolet ray as an actinic ray under the condition of 100 mJ/cm$^2$ using a Deep UV lamp ((SP-7) manufactured by Ushio Inc.), and image recorded matters were obtained.

The obtained image recorded matters were touched with a fingertip, the stickiness was evaluated in accordance with the following criteria:

A: no stickiness;

B: slight stickiness; and

C: noticeable stickiness.

TABLE 1A

| Pigment Dispersion No. | | Dispersant | Pigment | Evaluation of Pigment Dispersion | |
|---|---|---|---|---|---|
| | | | | Viscosity | Diameter of Pigment Particle |
| Example 1 | 1-1 | Specific Polymer Compound 1 | PR122 | A | A |
| Example 2 | 1-2 | Specific Polymer Compound 2 | PR122 | A | A |
| Example 3 | 1-3 | Specific Polymer Compound 3 | PR122 | A | A |
| Example 4 | 1-4 | Specific Polymer Compound 4 | PR122 | A | A |
| Comparative Example 1 | 2-1 | Dispersant A | PR122 | B | B |
| Comparative Example 2 | 2-2 | Dispersant B | PR122 | B | A |
| Example 5 | 1-5 | Specific Polymer Compound 1 | PY128 | A | A |
| Example 6 | 1-6 | Specific Polymer Compound 2 | PY128 | A | A |
| Example 7 | 1-7 | Specific Polymer Compound 3 | PY128 | A | A |
| Example 8 | 1-8 | Specific Polymer Compound 4 | PY128 | A | A |
| Comparative Example 3 | 2-3 | Dispersant A | PY128 | B | C |
| Comparative Example 4 | 2-4 | Dispersant B | PY128 | B | B |

TABLE 1B

| Pigment Dispersion No. | | Dispersant | Pigment | Evaluation of Pigment Dispersion | |
|---|---|---|---|---|---|
| | | | | Viscosity | Diameter of Pigment Particle |
| Example 9 | 1-9 | Specific Polymer Compound 1 | PR122 | A | A |
| Example 10 | 1-10 | Specific Polymer Compound 2 | PR122 | A | A |
| Example 11 | 1-11 | Specific Polymer Compound 3 | PR122 | A | A |
| Example 12 | 1-12 | Specific Polymer Compound 4 | PR122 | A | A |
| Comparative Example 5 | 2-5 | Dispersant A | PR122 | B | B |
| Comparative Example 6 | 2-6 | Dispersant B | PR122 | B | B |
| Example 13 | 1-13 | Specific Polymer Compound 1 | PB15:3 | A | A |
| Example 14 | 1-14 | Specific Polymer Compound 2 | PB15:3 | A | A |
| Example 15 | 1-15 | Specific Polymer Compound 3 | PB15:3 | A | A |
| Example 16 | 1-16 | Specific Polymer Compound 4 | PB15:3 | A | A |
| Comparative Example 7 | 2-7 | Dispersant A | PB15:3 | B | C |
| Comparative Example 8 | 2-8 | Dispersant B | PB15:3 | B | B |

From Table 1A and 1B, it can be found that the pigment dispersions (1-1 to 1-16) of Examples using the specific polymer compounds of the invention have a low viscosity and a small diameter of pigment particles irrespective of the kind of pigments, even if different polymerizable compounds are used. In contrast, it can be found that the pigment dispersions (2-1 to 2-8) of the comparative examples, in which the specific polymer compounds of the invention are not used, have a high viscosity, and poor dispersibility, and the pigment is not finely dispersed.

TABLE 2A

| Ink Composition No. | Pigment Dispersion No. | Pigment | Evaluation of Ink Composition | | | | |
|---|---|---|---|---|---|---|---|
| | | | | Dispersion Stability | | Diameter of Pigment particle | Curability |
| | | | Viscosity | After stored at room temperature | After stored at 70° C. | | |
| Example 17 | 1-1' | 1-1 | PR122 | A | A | B | A | A |
| Example 18 | 1-2' | 1-2 | PR122 | A | A | B | A | A |
| Example 19 | 1-3' | 1-3 | PR122 | A | A | A | A | A |
| Example 20 | 1-4' | 1-4 | PR122 | A | A | B | A | A |
| Comparative Example 9 | 2-1' | 2-1 | PR122 | A | C | C | A | A |
| Comparative Example 10 | 2-2' | 2-2 | PR122 | A | B | C | A | A |
| Example 21 | 1-5' | 1-5 | PY128 | A | B | C | A | A |
| Example 22 | 1-6' | 1-6 | PY128 | A | B | B | A | A |
| Example 23 | 1-7' | 1-7 | PY128 | A | B | B | A | A |
| Example 24 | 1-8' | 1-8 | PY128 | A | B | B | A | A |

TABLE 2A-continued

| | | | | | Evaluation of Ink Composition | | | |
| | | | | | | Dispersion Stability | Diameter | |
| | Ink Composition No. | Pigment Dispersion No. | Pigment | Viscosity | After stored at room temperature | After stored at 70° C. | of Pigment particle | Curability |
|---|---|---|---|---|---|---|---|---|
| Comparative Example 11 | 2-3' | 2-3 | PY128 | C | C | D | C | A |
| Comparative Example 12 | 2-4' | 2-4 | PY128 | B | C | C | B | A |

TABLE 2B

| | | | | | Evaluation of Ink Composition | | | |
| | | | | | | Dispersion Stability | Diameter | |
| | Ink Composition No. | Pigment Dispersion No. | Pigment | Viscosity | After stored at room temperature | After stored at 70° C. | of Pigment particle | Curability |
|---|---|---|---|---|---|---|---|---|
| Example 25 | 1-9' | 1-9 | PR122 | A | A | A | A | A |
| Example 26 | 1-10' | 1-10 | PR122 | A | A | A | A | A |
| Example 27 | 1-11' | 1-11 | PR122 | A | A | A | A | A |
| Example 28 | 1-12' | 1-12 | PR122 | A | A | A | A | A |
| Comparative Example 13 | 2-5' | 2-5 | PR122 | A | C | C | B | A |
| Comparative Example 14 | 2-6' | 2-6 | PR122 | A | B | C | B | A |
| Example 29 | 1-13' | 1-13 | PB15:3 | A | B | B | A | A |
| Example 30 | 1-14' | 1-14 | PB15:3 | A | B | A | A | A |
| Example 31 | 1-15' | 1-15 | PB15:3 | A | A | A | A | A |
| Example 32 | 1-16' | 1-16 | PB15:3 | A | A | A | A | A |
| Comparative Example 15 | 2-7' | 2-7 | PB15:3 | C | C | C | C | A |
| Comparative Example 16 | 2-8' | 2-8 | PB15:3 | B | B | C | B | A |

From Table 2A and 2B, it can be found that the ink compositions (1-1' to 1-16') of Examples prepared by the pigment dispersions using the specific polymer compounds of the invention have a low viscosity, a good dispersion stability after being stored at room temperature and at 70° C., and a small diameter of pigment particles, and a good curability. In contrast, the ink compositions (2-1' to 2-8') of Comparative Examples prepared with the use of the pigment dispersions, in which the specific polymer compounds of the invention are not used, have a high viscosity, large diameter of pigment particles, and in particular, a low dispersion stability after being stored at 70° C.

According to the invention, there can be provided a pigment dispersion in which pigment is finely dispersed, the dispersibility of pigment is excellent and the dispersion can provide clear color tone even after the pigment dispersion is stored over a long period of time.

Moreover, according to the invention, there can be provided an ink composition which has an excellent dispersion stability of pigment, has clear color tone and color-forming performance even after the ink composition is stored over a long period of time or is subjected to reiterative changes in temperature, and an ink composition which does not cause ink clogging in the nozzle at the time of jetting the ink composition, and can form a high-definition image when the ink composition is used for inkjet recording.

What is claimed is:

1. An ink composition comprising a pigment dispersion, a polymerizable compound, and a polymerization initiator, the pigment dispersion comprising a polymer compound represented by the following Formula (1-2), and a pigment:

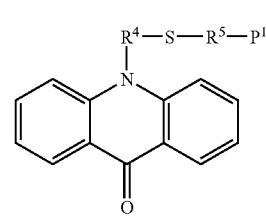

Formula (1-2)

wherein, in Formula (1-2), $R^4$ and $R^5$ each independently represent a single bond or a divalent organic linking group, and $P^1$ represents a polymer skeleton of the polymer compound, and the partial structure

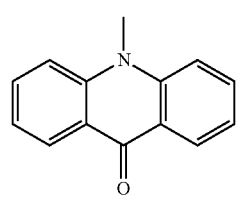

occurs solely at a polymer terminal of the polymer compound.

2. The ink composition according to claim 1, wherein the weight average molecular weight of the polymer compound represented by Formula (1-2) is in the range of from 1,000 to 300,000, and the content of the polymer compound is from 2 parts by mass to 100 parts by mass relative to 100 parts by mass of the pigment.

3. The ink composition according to claim 1, wherein the content of the polymer compound is from 2 parts by mass to 50 parts by mass relative to 100 parts by mass of the pigment.

4. A pigment dispersion comprising a polymer compound having a partial structure represented by the following Formula (1) solely at a terminal end of a main chain of the polymer compound, and a pigment:

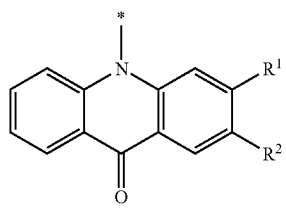

Formula (1)

wherein, in Formula (1), $R^1$ and $R^2$ each independently represent a hydrogen atom or a monovalent substituent; $R^1$ and $R^2$ may form a ring by bonding with each other; and * represents a position that is directly or indirectly bonded to the main chain structure of the polymer compound;

and wherein the polymer compound is represented by the following Formula (2-2):

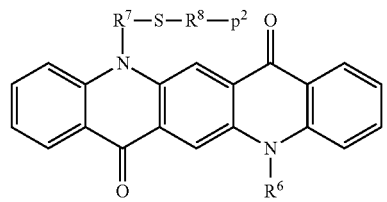

Formula (2-2)

wherein, in Formula (2-2), $R^6$ represents a hydrogen atom, an alkyl group, an acyl group or a carbamoyl group, $R^7$ and $R^8$ each independently represent a single bond or a divalent organic linking group, and $P^2$ represents a polymer skeleton of the polymer compound.

5. The pigment dispersion according to claim 4, wherein $R^7$ represents —$CH_2$—$CH_2$—, and $R^8$ represents a single bond.

6. The pigment dispersion according to claim 4, wherein the content of the polymer compound is from 2 parts by mass to 50 parts by mass relative to 100 parts by mass of the pigment.

7. An ink composition comprising the pigment dispersion according to claim 4.

8. The ink composition according to claim 7, further comprising a polymerizable compound.

9. The ink composition according to claim 8, further comprising a polymerization initiator:.

* * * * *